United States Patent
LaChiusa et al.

(10) Patent No.: US 10,235,204 B2
(45) Date of Patent: Mar. 19, 2019

(54) INTEGRATED MONITORING AND CONTROL OF PROCESSING ENVIRONMENT

(71) Applicant: Ab Initio Technology LLC, Lexington, MA (US)

(72) Inventors: Dino LaChiusa, Brookline, MA (US); Joyce L. Vigneau, Stoneham, MA (US); Mark Buxbaum, Acton, MA (US); Brad Lee Miller, Acton, MA (US); Tim Wakeling, Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 14/690,112

(22) Filed: Apr. 17, 2015

(65) Prior Publication Data
US 2015/0301861 A1    Oct. 22, 2015

Related U.S. Application Data

(60) Provisional application No. 61/980,694, filed on Apr. 17, 2014.

(51) Int. Cl.
*G06F 9/46* (2006.01)
*G06F 9/48* (2006.01)
(Continued)

(52) U.S. Cl.
CPC .............. *G06F 9/4881* (2013.01); *G06F 9/54* (2013.01); *G06F 11/3055* (2013.01);
(Continued)

(58) Field of Classification Search
CPC ...... G06F 9/4881; G06F 9/54; G06F 11/3003; G06F 11/3031; G06F 11/3055;
(Continued)

(56) References Cited

U.S. PATENT DOCUMENTS 6,792,460 B2 * 9/2004 Oulu ................... G06F 11/3495
709/224
8,364,802 B1 * 1/2013 Keagy ....................... G06F 8/63
709/223
(Continued)

FOREIGN PATENT DOCUMENTS

CN    103069394 A    4/2013
CN    103473164 A    12/2013
CN    103631694 A    3/2014

OTHER PUBLICATIONS

Solarwinds, "SolarWinds® Application Performance Monitor Administrator Guide", 2011, Solarwinds, Inc., 901 pages.*
(Continued)

*Primary Examiner* — Ted T. Vo
(74) *Attorney, Agent, or Firm* — Fish & Richardson P.C.

(57) ABSTRACT

A method of managing components in a processing environment is provided. The method includes monitoring (i) a status of each of one or more computing devices, (ii) a status of each of one or more applications, each application hosted by at least one of the computing devices, and (iii) a status of each of one or more jobs, each job associated with at least one of the applications; determining that one of the status of one of the computing devices, the status of one of the applications, and the status of one of the jobs is indicative of a performance issue associated with the corresponding computing device, application, or job, the determination being made based on a comparison of a performance of the computing device, application, or job and at least one predetermined criterion; and enabling an action to be performed associated with the performance issue.

69 Claims, 44 Drawing Sheets

(51) Int. Cl.
*G06F 9/54* (2006.01)
*G06F 11/30* (2006.01)
*G06F 11/32* (2006.01)
*G06F 11/34* (2006.01)

(52) U.S. Cl.
CPC ........ *G06F 11/3072* (2013.01); *G06F 11/328* (2013.01); *G06F 11/3409* (2013.01); *G06F 11/3003* (2013.01); *G06F 11/3031* (2013.01); *G06F 11/3433* (2013.01); *G06F 11/3452* (2013.01); *G06F 2201/865* (2013.01)

(58) Field of Classification Search
CPC ............... G06F 11/3072; G06F 11/328; G06F 11/3409; G06F 11/3433; G06F 11/3452; G06F 2201/865
USPC .......................................... 717/127; 718/102
See application file for complete search history.

(56) References Cited

U.S. PATENT DOCUMENTS

2009/0235267 A1  9/2009 McKinney
2012/0311475 A1* 12/2012 Wong .................. G06F 11/3003
                                                    715/772
2013/0239111 A1*  9/2013 Bingham ............ G06F 9/45533
                                                    718/1

OTHER PUBLICATIONS

News Staff, "Review: SolarWinds Server & Application Monitor", 2012, retrieved from http://www.neowin.net/news/review-solarwinds-server--application-monitor , 7 pages.*
Joe Dissmeyer, "SolarWinds Orion Network Performance Monitor", 2013, Solarwinds, Inc., 335 pages.*
International Search Report and Written Opinion, PCT/US2015/026448, dated Jul. 22, 2015 (11 pages).
International Preliminary Report on Patentability issued in PCT/US2015/026448, dated Oct. 18, 2016 (8 pages).

* cited by examiner

FIG. 5

| Job | Job Defi... | S... | P... | Predi... | Pred... | T... | Start | End | Elapsed | User | Total c... | CPU | Sys... | App... | Job... |
|---|---|---|---|---|---|---|---|---|---|---|---|---|---|---|---|
| bic fw sr | glbrpl src | ✓ | | | | | 12:12: | 12:12: | 1 sec | abinitio | 0.386 | 0.386 | FINAN | Data A | |
| bic fw sr | glbrplp1 s | ✓ | | | | | 12:12: | 12:12: | 1 sec | abinitio | 0.402 | 0.402 | FINAN | Data A | |
| bic fw sr | glbrcy src | ✓ | | | | | 12:12: | 12:12: | 2 sec | abinitio | 0.610 | 0.610 | FINAN | Data A | |
| bic fw sr | rec51 src | ✓ | | | | | 12:12: | 12:12: | <1 sec | abinitio | 0.397 | 0.397 | FINAN | Data A | |
| bic fw sr | brbr elc sr | ✓ | | | | | 12:12: | 12:12: | 1 sec | abinitio | 0.425 | 0.425 | FINAN | Data A | |
| bic fw sr | glbrbr src | ✓ | | | | | 12:11: | 12:11: | 1 sec | abinitio | 0.421 | 0.421 | FINAN | Data A | |
| bic fw sr | glbrbrp1 s | ✓ | | | | | 12:11: | 12:11: | 2 sec | abinitio | 0.433 | 0.433 | FINAN | Data A | |
| bic fw sr | 045 prod | ✓ | | | | | 12:11: | 12:11: | 2 sec | abinitio | 0.453 | 0.453 | FINAN | Data A | |
| bic fw sr | 021 clie s | ✓ | | | | | 12:11: | 12:11: | 1 sec | abinitio | 0.409 | 0.409 | FINAN | Data A | |
| bic fw sr | 043 prod | ✓ | | | | | 12:11: | 12:11: | 1 sec | abinitio | 0.417 | 0.417 | FINAN | Data A | |
| bic fw sr | 037 prod | ✓ | | | | | 12:11: | 12:11: | <1 sec | abinitio | 0.404 | 0.404 | FINAN | Data A | |
| bic fw sr | 229 clie s | ✓ | | | | | 12:11: | 12:11: | 1 sec | abinitio | 0.405 | 0.405 | FINAN | Data A | |
| bic fw sr | 015 prod | ✓ | | | | | 12:11: | 12:11: | <1 sec | abinitio | 0.422 | 0.422 | FINAN | Data A | |
| bic fw sr | 015 clie s | ✓ | | | | | 12:11: | 12:11: | 4 sec | abinitio | 0.440 | 0.440 | FINAN | Data A | |

FIG. 7

| Type | Status | Issues | Instance Name |
|---|---|---|---|
| ab-db | □ | □ | MHDB |
| Enterprise Meta > Enviro... | △ | ! | hostb-emetr |
| Key Server | △ | △ | Keyserver1 |
| Application Hub | ✓ | | hostb-apphub |
| Ab Initio Bridge | △ | | hostb-bridge-7070 |
| Authorization Gateway | △ | | hostc-AG1 |
| Application Hub | ✓ | | hostd-apphub |
| Help Server | △ | | hostb-help |
| Oracle database | △ | | ORA-AG-PROD |
| Metadata Hub | △ | | hosta-metahub |
| Application Configuratio... | △ | | hostd-appconf |
| Co>Operating System | ✓ | | hostd-serversoftware |

▽ Metadata Hub: hosta-metahub  ⊗
URL: ⇗ http://hosta:6761
Host: Host A
Category: Output Systems
Actions
▦ Details
✎ Edit
⇗ Configure
☐ Stop
🗎 Open Log File
✉ Review Issues
✉ Suspend Alerting
⇧ Migrate to new app-hub
🖳 Upgrade
☒ Remove from Monitor 3.2 | Host D | Enterprise Systems

FIG. 9A

| Type | Status | Issues | Instance Name | Version | Host | Category |
|---|---|---|---|---|---|---|
| ab-db | ☐ | | MHDB | | | |
| Enterprise Meta > Enviro... | △ | ! | hostb-emetr | | | |
| Key Server | △ | △ | Keyserver1 | | | |
| Application Hub | ✓ | | hostb-apphub | 3.1.4 | Host D | Output Systems |
| Ab Initio Bridge | △ | | hostb-bridge-7070 | 3.1.1.1 | Host B | Enterprise Systems |
| Authorization Gateway | △ | | hostc-AG1 | | | |
| Application Hub | ✓ | | hostd-apphub | | | |
| Help Server | △ | | hostb-help | | | |
| Oracle database | △ | | ORA-AG-PROD | | | |
| Metadata Hub | △ | | hosta-metahub | | | |
| Application Configuratio... | △ | | hosta-appconf | | | |
| Co>Operating System | ✓ | | hostd-serversoftware | | | |

✓ Application Hub: hostb-apphub    ⊗   910

Host:   Host B
Root directory: c:/AbInitio-AppHub
Version: 3.1.1.2
Owner: fjones
Category: Infrastructure Team Connections:
  Run Co>Operating Systems: 4
  EME Trs: 2
  Bridges: 2

Actions:   ▦ Details
         ✎ Edit
         ⚙ Configure
         ⊕ Add Ab Initio Application
         ☒ Remove from Monitor

- ▲ Published Bridges
- ▲ Published Key Servers
- ▲ Other Config Vars

AB_AIR_BRANCHES @ deveme : main release_1_0_ : Release_2_0
AB_DISPLAY_NAME @ deveme.main : Main branch
AB_DESCRIPTION @ deveme.main : Branch for all new development
AB_DISPLAY_NAME @ deveme.release_1_0_ : Release 1.0 branch
AB_DESCRIPTION @ deveme.release_1_0_ : Branch for hotfixes to Rel 1.0 ONLY
AB_DISPLAY_NAME @ deveme.release_2_0_ : Release 2.0 branch
AB_DESCRIPTION @ deveme.release_2_0_ : Branch for hotfixes to Rel 2.0 ONLY AB_AIR_ROOT @ testeme : //unixhost/disk1/data/test/eme
AB_DISPLAY_NAME @ testeme : Test technical repository
AB_DESCRIPTION @ testeme : QA team should use this technical repository AB_KEYSERVER_GROUPS : examplecorp
AB_KEYSERVER_URLS @ examplecorp : abks://keyserver1.examplecorp.com:6150 abks://k
AB_KEYSERVER_ADMIN_EMAIL @ examplecorp : abadmin@examplecorp.com
AB_DESCRIPTION @ examplecorp : development key servers

FIG. 10(Cont...)

| Type | Status | Issues | Instance Name | Version | Host |
|---|---|---|---|---|---|
| ab-db | □ | □ | MHDB | 3.1.4 | Host D |
| Enterprise Meta > Enviro... | △ | ! | hostb-emetr | 3.1.1.1 | Host B |
| Key Server | △ | △ | Keyserver1 | 3.0.5 | Host B |
| Application Hub | ✓ | | hostb-apphub | 3.1.1.2 | Host B |
| Ab Initio Bridge | △ | | hostb-bridge-7070 | 3.2 | Host B |
| Authorization Gateway | △ | | hostc-AG1 | 3.1.4 | Host C |
| Application Hub | ✓ | | hostd-apphub | 3.1.2 | Host B |
| Help Server | △ | | hostb-help | 3.1.4 | Host B |
| Oracle database | △ | | ORA-AG-PROD | | Host A |
| Metadata Hub | △ | | hosta-metahub | 3.1.5 | Host A |
| Application Configuratio... | △ | | hosta-appconf | 3.1.5 | Host A |
| Co>Operating System | ✓ | | hostd-serversoftware | 3.2 | Host D |

190

Category

🖳 Host: Host B

Operating system: Linux 2.6.18-92.el5PAE # 1 SM...
Aliases: abc xyz
Key expiration: 2013-12-31
Keyed products: 4

Host statistics:
Load avg: 2.32    Num processes: 147
Non-idle CPU: 16%    Mem in use: 82%
File systems: 2

Job statistics:
Jobs today: 148    Avg daily jobs: 311
CPU today: 0.0 sec    Avg CPU over 1 days: 0 sec Actions:
  ▦ Details
  ✎ Edit
  ⊙ Review Issues
    Suspend Alerting
  🗝 Return Key
  🗝 Install New Key
  ⇧ Run ab-computer-info
  ☒ Remove from Monitor

FIG. 11A

| Type | Status | Issues | Instance Name | Version | Host |
|---|---|---|---|---|---|
| ab-db | □ | | MHDB | 3.1.4 | Host D |
| Enterprise Meta > Enviro... | △ | ! | hostb-emetr | 3.1.1.1 | Host B |
| Key Server | △ | △ | Keyserver1 | | |
| Application Hub | ✓ | | hostb-apphub | | |
| Ab Initio Bridge | △ | | hostb-bridge-7070 | | |
| Authorization Gateway | ✓ | | hostc-AG1 | | |
| Application Hub | △ | | hostd-apphub | | |
| Help Server | △ | | hostb-help | | |
| Oracle database | △ | | ORA-AG-PROD | | |
| Metadata Hub | △ | | hosta-metahub | 3.1.5 | Host A |
| Application Configuratio... | △ | | hosta-appconf | 3.1.5 | Host A |
| Co>Operating System | ✓ | | hostd-serversoftware | 3.2 | Host D |

Category
Host: Host B
Operating system: Linux 2.6.18-92.el5PAE #1 SM...

abc xyz
2013-12-31

Keyed Products 192

| Name | Expiration Date |
|---|---|
| Co>Operating System | 2013-06-01 |
| Enterprise Meta Environment | 2013-12-31 |
| Data Profiler | 2013-11-15 |
| Conduct>It | 2014-03-31 |

4
2.32    Num processes: 147
16%     Mem in use: 82%
2

Job statistics:
Jobs today: 148         Avg daily jobs: 311
CPU today: 0.0 sec      Avg CPU over 1 days: 0 sec Actions:
Details
Edit
Review Issues
Suspend Alerting
Return Key
Install New Key
Run ab-computer-info
Remove from Monitor

FIG. 11B

☆Favorites | ⓖ PROD - Hosts - Ab Initio Control Center

ⓖ Ab Initio Control Center | PROD ▼ | 👤 Logged in as: admin ▼ Log Out | Powered by Ab Initio 🏠 Home | 🖥 Hosts | 📦 Products and Services | 🔌 ⚙ ▼ | As of : 24 Jun 2013 17:47:28

Jobs Overview — 260

Job metric: [#Jobs ▼]  Group by: [Status ▼]  Last [5] [◀|◀] [Days ▼]

All Hosts | All Systems                                                        🗓

| Status | Issues (alerts) | Name | ○ | ○ | ✉ | △ | ☐ | ✓ | Total |
|--------|-----------------|------|---|---|---|---|---|---|-------|
| 🕐 | ! 21(0) | 🖥 CandyCorp | 2 | 3 (!2) | 5 | 60 (!2 ⚑1) | 1 | 50 (!7) | 98 |
| ✓ | △ 4 (2) | 🖥 Finance | 3 | 1 | 25 | 1 (△2) | 2 | 13 | 130 |

262 ⟋             ⟍ 264              266 ⟋

Done                                              🌐 Local Intranet  | 🔍 110%

FIG. 12B

| | | | | | | | |
|---|---|---|---|---|---|---|---|
| ☆Favorites | ⓘ PROD - Hosts - Ab Initio Control Center | | | | | | |

360 →

| PROD ✓ | | 👤 Logged in as: admin ▾ Log Out | Powered by Ab Initio |
|---|---|---|---|

| 🏠 Home | 🖥 Hosts | 🛒 Products and Services | 🔌 ⊘ ▾ | As of: 24 Jun 2013 17:47:28 |
|---|---|---|---|---|

Jobs Overview  Job metric: [CPU ▾]  Group by: [System/Host ▾]  Last [5] [▸▸]  [Days ▾]

| All Hosts | All Systems | | | | | | |
|---|---|---|---|---|---|---|---|
| | ↓364 | | | | | | 📊 |
| Status Issues (alerts) | | #jobs | Total CPU | Total Read,Records | Avg rate, records | Job metric 4 | etc |
| ⇦ | !1 (0) | 📦 dashboard-l.abinitio.com | | | | | |
| ⇨ | --- | 📦 framework-l.abinitio.com | | | | | |
| ⇦ | !21 (0) | 📦 linux13.abinitio.com | | | | | |
| ⇦ | △4 (0) | 📦 mhub-linux1.abinitio.com | | | | | |
| ⇦ | !1 (0) | 📦 nosuchhost.abinitio.com | | | | | |
| ⇦ | !1 (1) | 📦 nplus1.abinitio.com | | | | | |
| ⇨ | △4 (2) | 📦 opcontest3.abinitio.com | | | | | |
| ⇨ | --- | 📦 rialto2.abinitio.com | | | | | |

362

Done | | 🌐 Local Intranet | 🔍 110% ▸

Details for Alert Definition: Database Down

[ Save ] [ Cancel ]  🔗 456

| Info | Matching Rules | Actions |

| Action Type | Details | | Recipients |
|---|---|---|---|
| Send Mail | From: Da Boss; Subject: DB Down; Body: The Database is down | | Mark Brown, ... |
| Run Program | Command Line: /usr/log/sms.exe $|alertvalue } | | |

[ ✏ Edit... ] [ ✖ Delete ]

[ ➕ Create... ]

Add Other Product

| Info | Related Items | Commands |

Name: Other Product
Product type: Other Product
Description:
Host:
Category:

Info

Version:
Configuration file:
Configuration user:
Port:
URL:
AB_HOME:
Log file path:
Working directory:

Cancel    OK

INTEGRATED MONITORING AND CONTROL OF PROCESSING ENVIRONMENT

CLAIM OF PRIORITY

This application claims priority to U.S. Patent Application Ser. No. 61/980,694, filed on Apr. 17, 2014, the entire contents of which are hereby incorporated by reference.

BACKGROUND

This description relates to integrated monitoring and control of a processing environment.

Some computer programs can monitor the performance of a computing device, such as the CPU (central processing unit) usage or amount of available disk space on the computing device. Some computer programs can monitor the performance of processes running on a computing device or can control an execution schedule for such processes.

SUMMARY

In general, in one aspect, a method of managing components in a processing environment is provided. The method includes monitoring (i) a status of each of one or more computing devices, (ii) a status of each of one or more applications, each application hosted by at least one of the computing devices, and (iii) a status of each of one or more jobs, each job associated with at least one of the applications; determining that one of the status of one of the computing devices, the status of one of the applications, and the status of one of the jobs is indicative of a performance issue associated with the corresponding computing device, application, or job, the determination being made based on a comparison of a performance of the computing device, application, or job and at least one predetermined criterion; and enabling an action to be performed associated with the performance issue.

In general, in another aspect, a method of managing components in a processing environment is provided. The method includes monitoring (i) a status of each of one or more computing devices, (ii) a status of each of one or more applications, each application associated with at least one of the computing devices, and (iii) a status of each of one or more jobs, each job associated with at least one of the applications; and enabling display, on a user interface, of first information indicative of the status of one or more of the computing devices, second information indicative of the status of one or more of the applications, and third information indicative of the status of one or more of the jobs. For each computing device having corresponding first information displayed on the user interface, the method enables a user to access the second information for one or more applications associated with the computing device and the third information for one or more jobs associated with the computing device. For each application having corresponding second information displayed on the user interface, the method enables the user to access the first information for one or more computing devices with which the application is associated and the third information for one or more jobs associated with the application. For each job having corresponding third information displayed on the user interface, the method enables the user to access the first information for one or more computing devices with which the job is associated and the second information for one or more applications with which the job is associated.

These aspects can include one or more of the following advantages. The control center described here provides a single, integrated location for managing the components in a processing environment. A user of the control center can view status information for one or more components of the processing environment in a display that highlights interrelationships among the components. Through the control center, the user can view log files, as well as install and upgrade components. This integrated display makes it easy for the user to understand how the performance of one component can affect the performance of another component of the processing environment and thus facilitates the diagnosis of a performance issue. This understanding in turn can facilitate the user's ability to efficiently take action to manage performance issues that may occur with one or more components of the processing environment. In addition, the straightforward and intuitive access to information and actions can enable even users with limited technical knowledge to perform tasks such as restarting an application, monitoring or updating a license key, or managing the configuration of an application.

Other features and advantages of the invention will become apparent from the following description, and from the claims.

DESCRIPTION OF DRAWINGS

FIGS. 4-8 are screenshots of example user interfaces.
FIGS. 9A and 9B are screenshots of example user interfaces.
FIG. 10 is a screenshot of an example user interface.
FIGS. 11A and 11B are screenshots of example user interfaces.
FIGS. 12A-12D are screenshots of example user interfaces.
FIGS. 13A and 13B are screenshots of example user interfaces.
FIGS. 14A-14E are screenshots of example user interfaces.
FIGS. 15A and 15B are screenshots of example user interfaces.
FIGS. 17A-17C are screenshots of example user interfaces.
FIGS. 22-24 are screenshots of example user interfaces.

DESCRIPTION

We describe here a control center that facilitates the integrated management of various components of a processing environment. The control center can monitor and display the status of components of the processing environment, such as computing devices, applications, or jobs. Status information can be displayed on a user interface in a way that highlights interrelationships among components, enabling a user to easily understand how the status of one component may affect the status of another component. This display of interrelationships among components can also facilitate an investigation into the factors surrounding a performance issue experienced by one of the components of the processing environment. The control center also enables a user to take actions, such as configuration or control actions, for one or more of the components of the processing environment. The ability to actively manage the components of the processing environment allows the user both to react operationally to a performance issue experienced by one of the components and to react proactively to address a potential problem before there is an adverse impact on the performance of the components of the processing environment.

Figure 1:
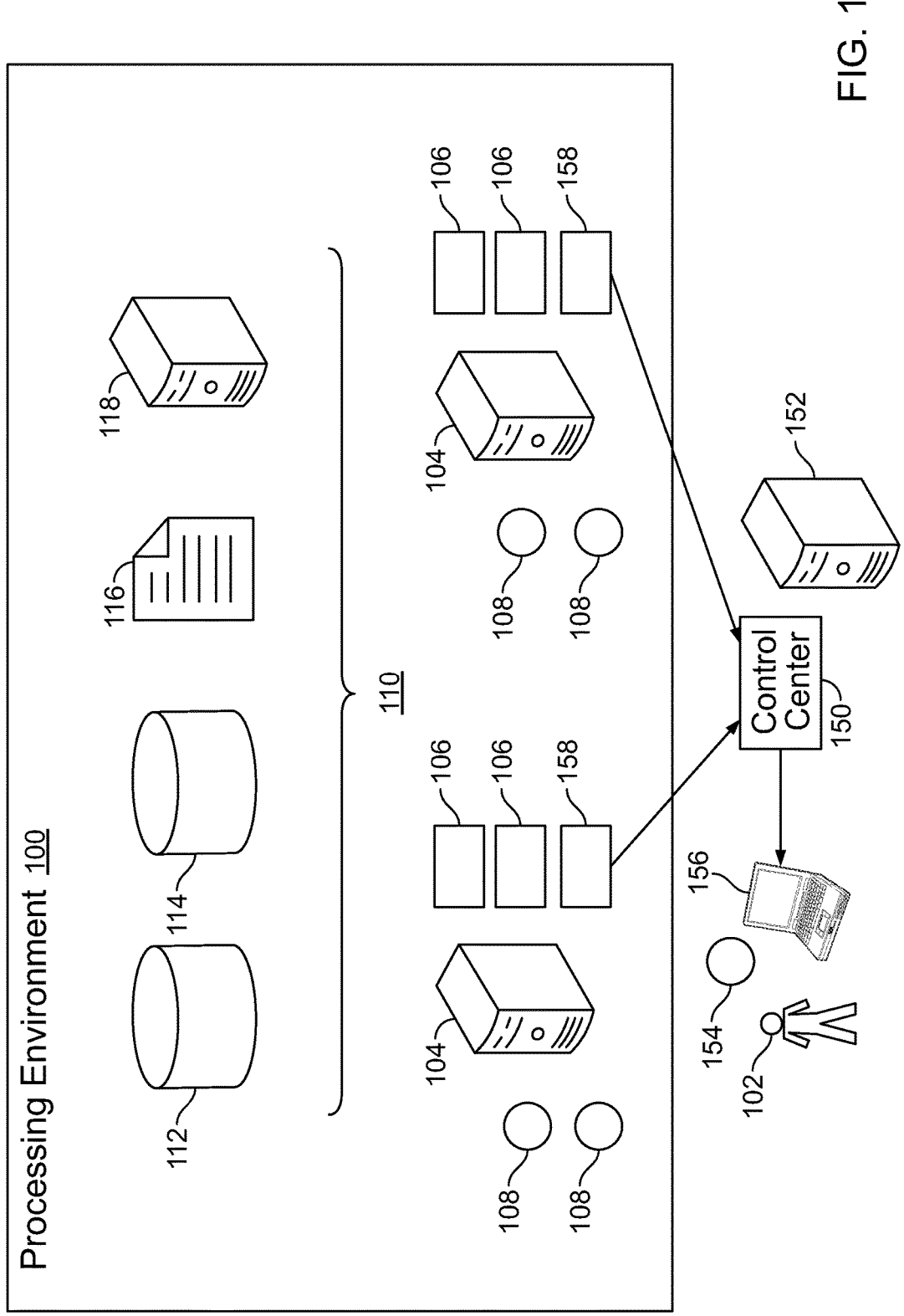
FIG. 1 is a block diagram of a processing environment.

Referring to FIG. 1, a processing environment 100 includes hardware and software components that can be operated by or on behalf of a user 102 to process data. The hardware components can include hardware computing devices 104, such as servers, which we sometimes call "hosts." Each of the servers may include one or more data processors and one or more storages for storing instructions executed by the one or more data processors. The software components of the processing environment 100 can include applications 106, jobs 108, or services 110. The software components each executes on, or has an effect on, one or more of the hosts 104.

An application 106 is a computer program, such as a software product, that can be used to carry out various data processing functions, including, e.g., setting up a framework for data processing, executing a data processing framework, or analyzing processed data. An application can be a program that is targeted at performing or helping a user perform a task in a particular domain, such as word processing. One or more jobs 108 can be executed using one or more of the hosts 104, one or more of the applications 106, or both, of the processing environment 100. A job 108 is a set of one or more operations that are executed to process data. An example of a job is a graph or plan in a graph-based processing environment.

In some examples, an application 106 or a job 108 can utilize one or more services 110. A service 110 is a special case of an application, such as a long-running application, e.g., an application that is expected to be running as long as a host or server is running, that is targeted at a specific set of tasks (services) to be performed on behalf of an application or user. Example tasks that can be performed by a service 110 include, e.g., logging events or making events visible through a user interface. Example services 110 include, e.g., a database 112, a queue 114, a file 116, an application server 118, or another type of service.

In some implementations, the processing environment 100 may be provided by a software developer to a customer, and the processing environment 100 may be shipped with a variety of standard software products and services. For example, the software products may include executable graph modules, plans, and other elements. Over time, the customer may purchase additional software products from the software developer. The customer may build custom applications using the standard products and services provided by the software developer. The software developer may build custom applications according to the customer's specification. In this description, the term "application" will be used to generally refer to standard software products and services provided by the software developer, and customized software products and services made by either the developer or the customer. The processing environment 100 supports execution of various kinds of applications, including the standard products and services, and custom applications.

Although only one user 102 is shown in the figure, there can be many users 102, and different users may have different roles. For example, the term "user" depending on context may refer to more technically sophisticated users who customize products and services, or less technical users who use the customized products and services.

In some examples, the user 102 can purchase or otherwise acquire access to some or all of the computing power of one or more of the hosts 108. For instance, the user 102 can purchase a license that allows the user to utilize a specific portion of the processing power of a particular host 104 to enable the operation of one or more applications 106, to execute one or more jobs 108, or both.

An integrated control center 150 monitors the real time status of the hardware and software components of the processing environment 100. In some examples the control center 150 can execute on one of the hosts 104; in some examples, the control center 150 executes on a distinct computing device 152. For instance, the control center 150 can monitor the status of the hosts 104 and applications 106 to which the user 102 has access and the jobs 108 being executed on behalf of the user 102. Real time status information 154 about the components of the processing environment 100 can be displayed on a user interface 156. The status information 154 can be displayed in an integrated manner so as to highlight relationships among individual components of the processing environment 100, such as hosts 104, applications 106, jobs 108, services 110, or other components. The status information 154 can be displayed so as to display the status of one or more of the components or relationships among the status of individual components of the processing environment. Real time status information and historical status metrics and data processing metrics (e.g., metrics related to numbers of records processed, processing times, processing durations, or other metrics) can be available through the control center. Through the user interface 156, the user 102 can take actions related to one or more of the components of the processing environment or can define actions that are to be carried out automatically in response to a predefined occurrence related to one or more of the components of the processing environment.

Figure 2:
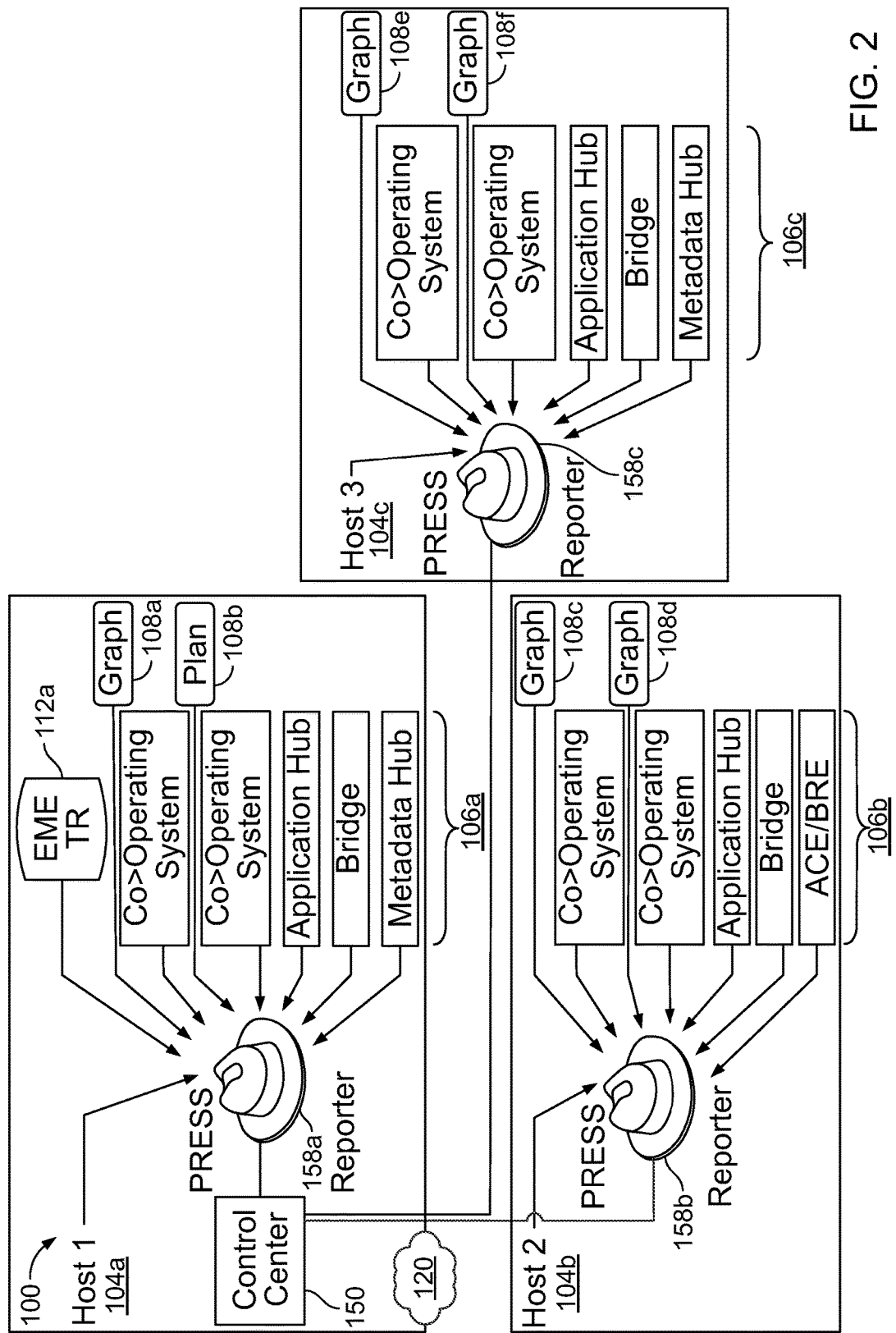
FIG. 2 is an example of a processing environment.

The integrated control center 150 can be used by the user 102 to conveniently monitor the status of standard products and services purchased from the software developer, custom products and services that the software developer built for the customer, and custom products and services made by the customer. The customer may purchase products and services from multiple software vendors, and custom applications may be built based on those products and services. The products and services may need to be upgraded from time to time. The licenses for different products and services may expire at different times. The control center 150 includes diagnostic tools for identifying performance issues to allow the user 102 to remedy the problems. The control center 150 includes predictive tools for identifying potential performance issues so that preventive measures can be applied. The control center 150 allows the user 102 to conveniently keep track of the operations of the various components of the processing environment 100 to ensure that upgrades are performed at appropriate times, licenses are renewed at the appropriate times, and that the various components operate properly. Referring to FIG. 2, in a specific example of a processing environment 100, a suite of applications 106a, 106b, 106c is running on each of three hosts 104a, 104b, 104c. Specific examples of products and services can include, e.g., a Co>Operating System, an Application Hub, a Bridge, a Metadata Hub, and a Business Rules Editor (BRE), all available from Ab Initio Software LLC, Lexington, Mass. Jobs 108a-108f, represented by a dataflow graph or a set of dataflow graphs (referred to as a plan), are running using the Co>Operating System on each host 104. The processing environment also includes a database 112a located on the host 104a. The control center in this example executes on the host 104a.

The control center 150 monitors the status of the components of the processing environment 100 by communicating with a reporter application 158 (also referred to as a reporter) running on each host 104, e.g., via a network connection such as the Internet 120 or a local intranet. Thus, in the example of FIG. 2, a reporter 158a is located on the host 104a, a reporter 158b is located on the host 104b, and a reporter 158c is located on the host 104c. The reporter 158 is a service that is capable of acquiring status information about the host 104 on which the reporter 158 is located as well as status information about each of the applications 106, jobs 108, and services 110 located on that host 104. In some examples, the reporter 158 can actively seek out status information about one or more of the components of the processing environment 100. In some examples, the components of the processing environment 100 provide status information to the reporter 158.

In some examples, a reporter 158 on a host 104 can automatically detect the components of the processing environment 100 that are associated with that host 104. For instance, a reporter 158 that possesses native knowledge of the relationships between jobs and queues may be capable of automatically detecting a queue that is related to jobs monitored by the reporter 158. In some examples, if the reporter 158 shares a common software underpinning with the components (e.g., are provided by or enabled by the same software company), the reporter 158 may be able to automatically detect those components.

Figure 16:
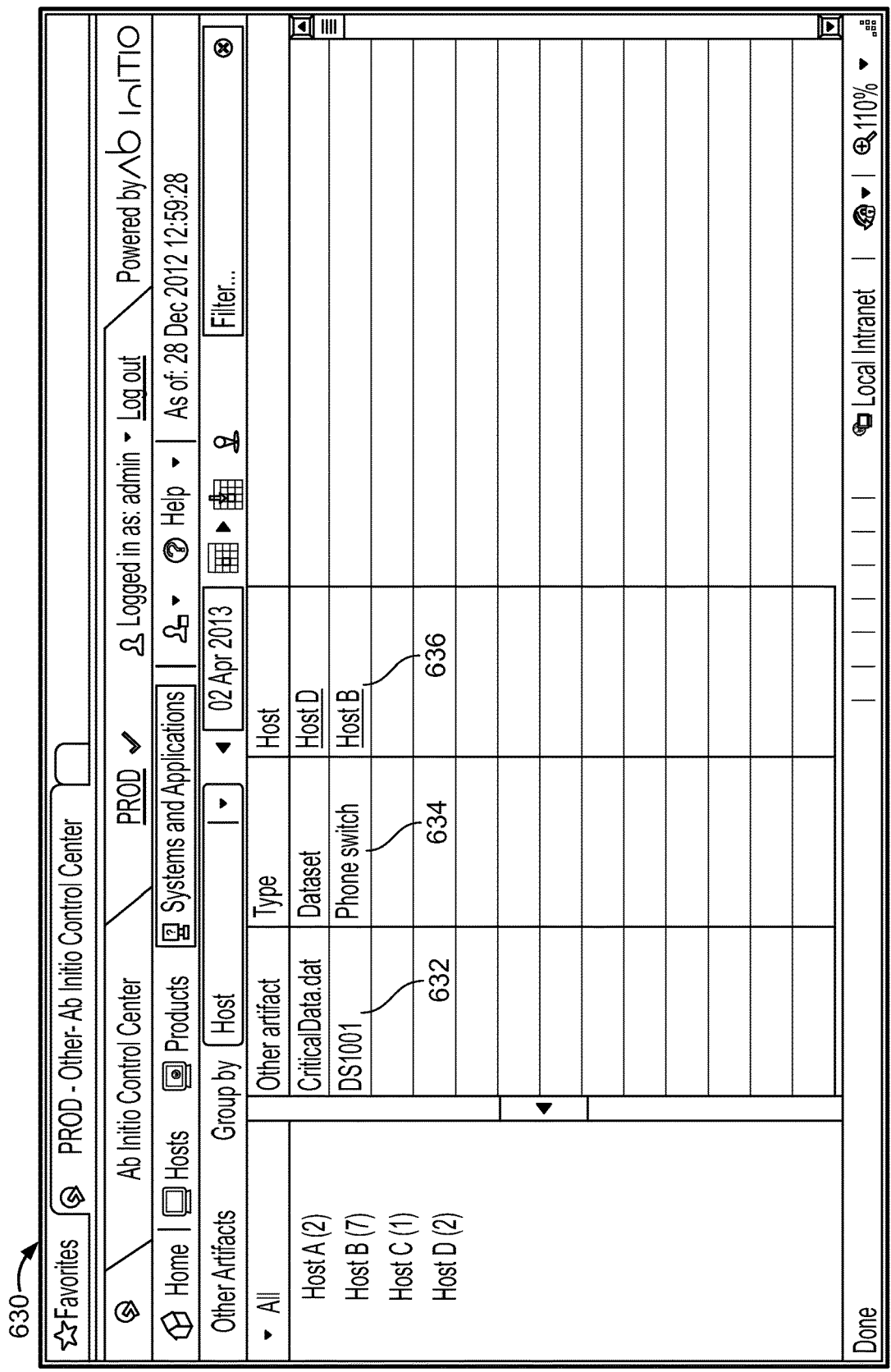
FIG. 16 is a screenshot of an example user interface.

The reporter 158 can provide information about custom or third party components. For example, an application can inform the control center 150 about the existence and status of custom or third party components to enable the control center 150 to display information associated with the components to the user 102. For example, the component can be a third party hardware or software component, such as a telephone switch (custom object) or a third party database. This can make the user's understanding of the processing environment 100 more complete. As described in more detail below, an example user interface for monitoring various custom objects or third party components is shown in FIG. 16.

Figure 17B:
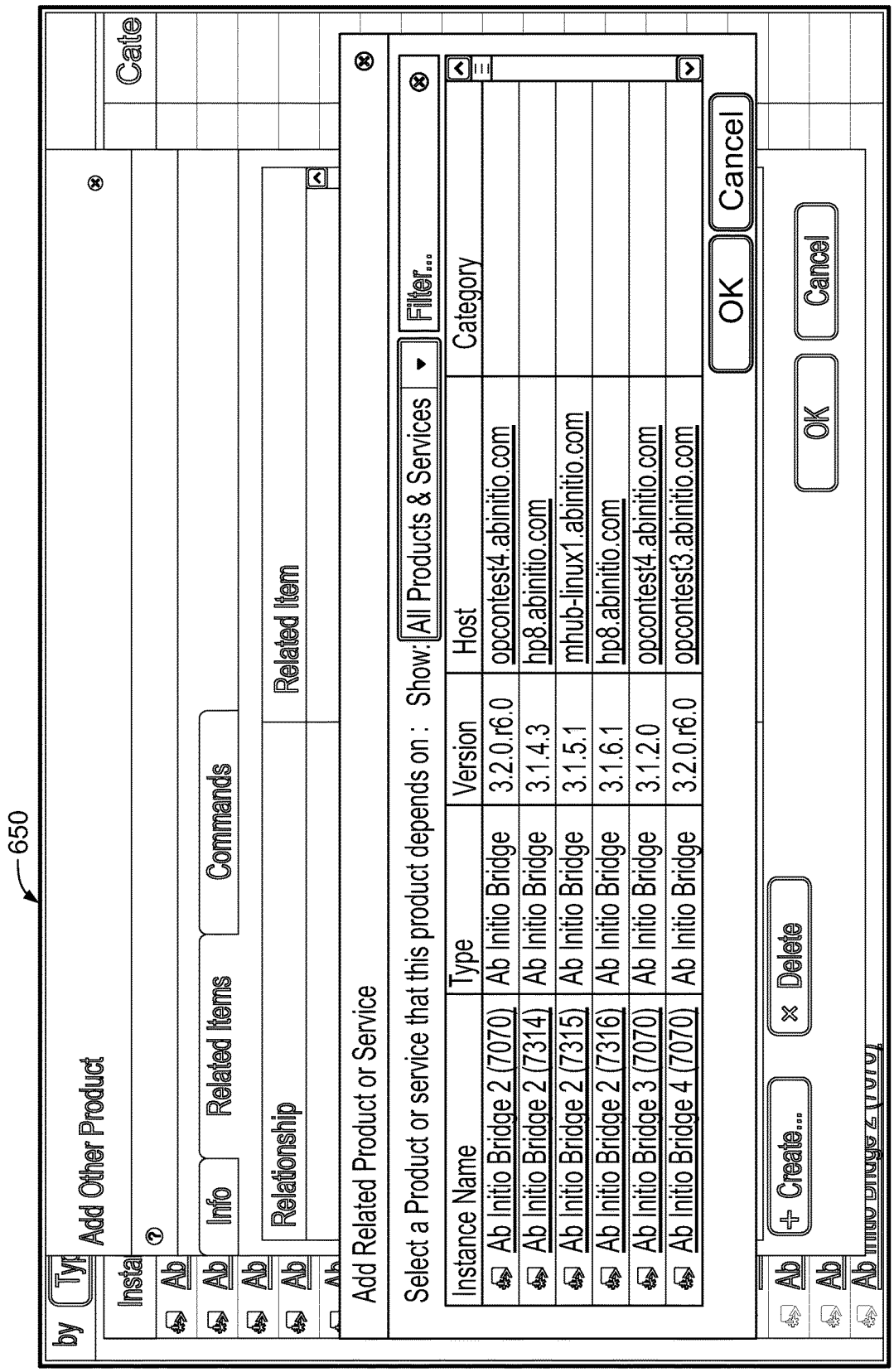
Figure 17C:
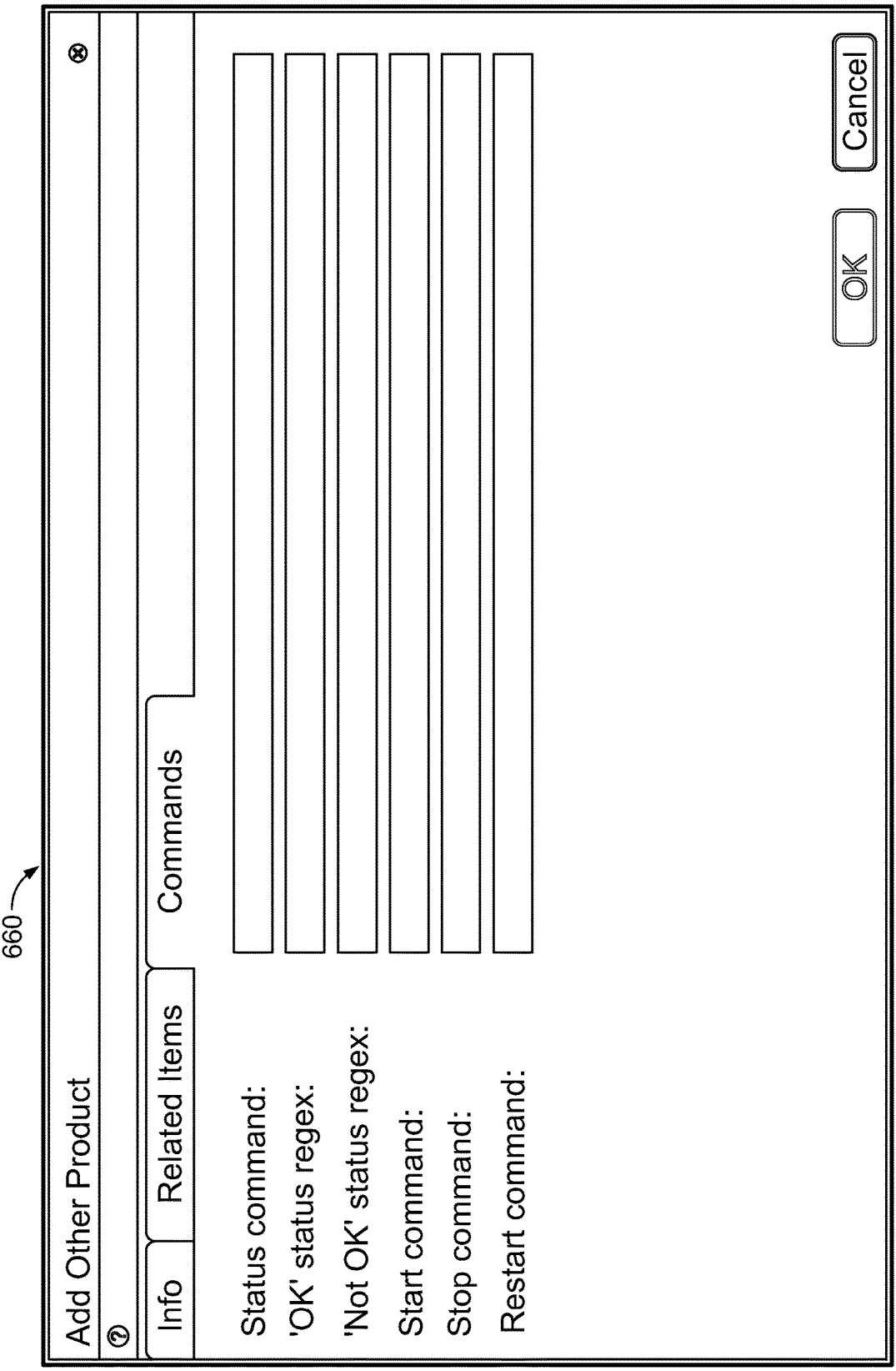

A user who has the authority to manage products and services can define a custom product or service and provide commands for obtaining the status and other information from that custom product or service. For example, commands can be defined for obtaining the status and other information from a third party database. Using the commands thus defined, the reporter 158 can monitor the custom product or service (e.g., the third party database) similar to monitoring standard products and services that the control center is able to monitor natively. In addition, when defining the custom product or service, the user can specify commands to control the component, such as commands for stopping and starting the component, or information such as the location of the log file, the location of the configuration file, the URL associated with the component. Afterwards, the control center 150 can provide the commands to other users for use in controlling the third party component and access various types of information of the third party component. This enables users to leverage the ability of the control center 150 to perform operations more easily so that less technical users can perform more functions. The user can also indicate which other components of the processing environment are related to the custom component. As described in more detail below, example user interfaces for providing commands for obtaining information on custom products or services are shown in FIGS. 17A to 17C.

Figure 3A:
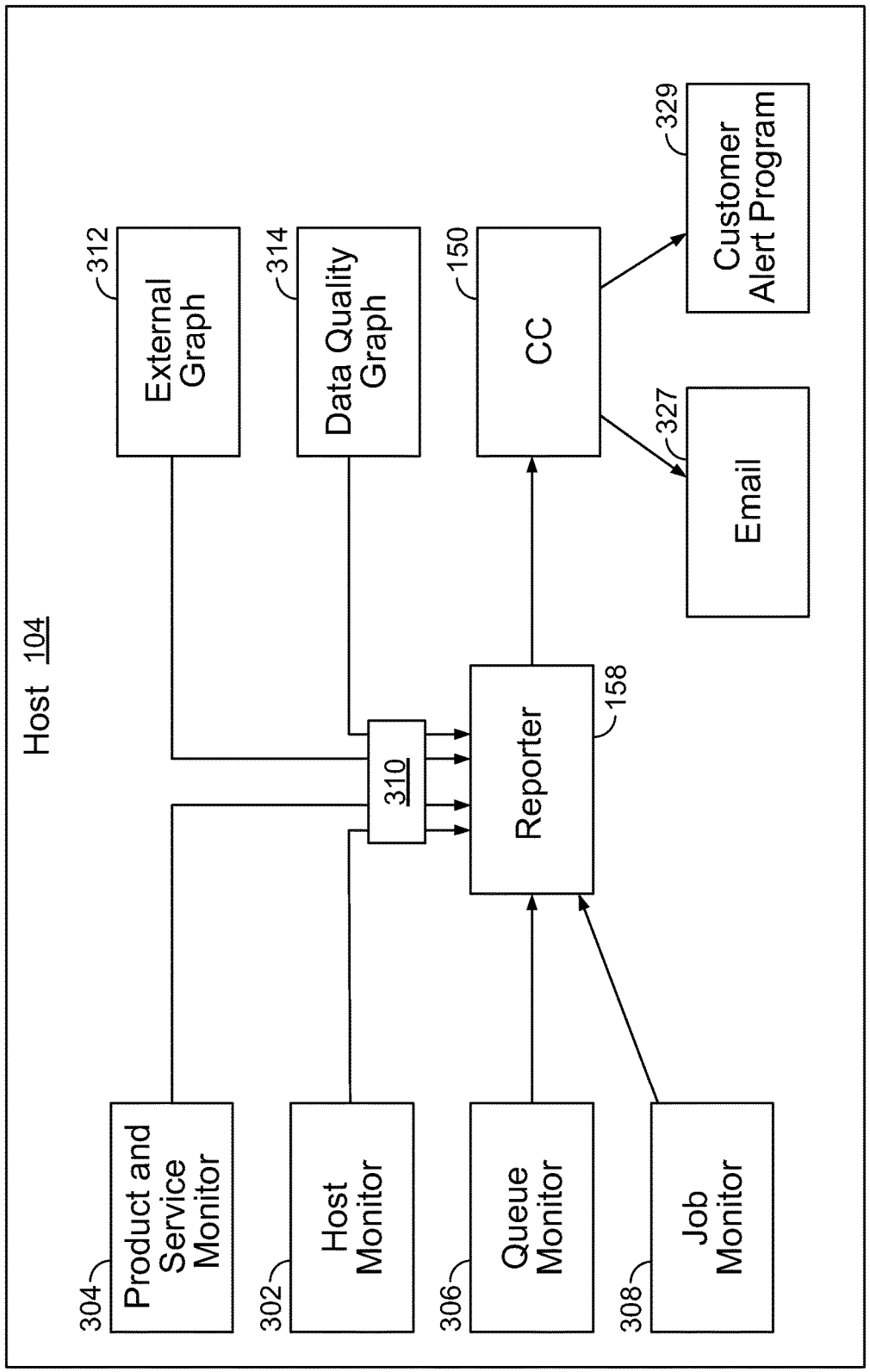
FIG. 3A is a block diagram of a host.

Referring to FIG. 3A, a reporter 158 on a host 104 interacts with and monitors the status and performance of the host itself through a host monitoring module 302. For instance, the host monitoring module 302 receives a list of file system directories on the host 104, gathers operational information about the host and its file system directories, and writes the results to a file that can be read by the reporter 158.

A product and service monitoring module 304 monitors the status of products and services (such as databases, key servers, or other services) installed on or otherwise related to the host 104. The product and service monitoring module 304 uses information about known product or service types and installed product instances to monitor product and service status. For instance, the product and service monitoring module 304 may keep track of which products and/or services have been installed at the host 104, when they were installed, whether the products/services are scheduled for updates, and whether the products/services scheduled for updates have actually been updated. For instance, the product and service monitoring module 304 can perform a product discovery function to survey the host 104 for installed products or services of interest. The product and service monitoring module 304 can perform a product status function to obtain status information for each known product or service, e.g., by issuing a status command to each product or service and receiving status information from each product or service in response. The product and service monitoring module 304 writes the results to a file that can be read by the reporter 158.

A queue monitoring module 306 monitors the status of queues installed on or otherwise related to the host 104. For instance, the queue monitoring module 306 receives a list of queue directories, runs an inquiry command against each queue, and writes the results to a file to be read by the reporter 158. Other resources can be monitored by other resource monitoring modules, which write status information to a file to be read by the reporter 158.

A job monitoring module 308 monitors the execution of jobs, such as graphs or plans, on the host. The job monitoring module 308 can instrument the running of jobs, for instance, such that job start and end times and other job life cycle events are logged to a file to be read by the reporter 158. The job monitoring module 308 can run a job monitor to aggregate a job's raw tracking information and can write the results, just as job metric values, to a file to be read by the reporter 158. In some cases, raw tracking information can include arrays of encodings, e.g., referring to jobs by identifiers rather than by names. In some cases, a file monitoring module (not shown) can monitor the status of files. File monitoring is based on jobs' instrumentation writing file lifecycle events to the same file as the job monitoring module 308, to be read by the reporter 158.

Each of these monitoring modules 302-308 provides information 310, such as operational status information, performance metrics, or information about error or warning conditions, to a file that is read by the reporter 158. The reporter 158 in turn passes the information 310 to the control center 150. For instance, the reporter 158 can read the files written by the monitoring modules, issue web service requests, and forward the information from the files to the control center 150 for inclusion in an operational database. The reporter 158 can launch the monitoring modules 302-308, e.g., at periodic intervals, e.g., once per minute, once every five minutes, once every ten minutes, or at another interval. The reporter can issue web service requests to retrieve information from the control center 150 that can be used to direct the operation of the monitoring modules 302-308.

In the example of FIG. 3A, the reporter 158 and the control center 150 are hosted on the same host 104; in some examples, the reporter 158 can communicate with a control center 150 located on a different computing system. Additional applications, such as "External Graph" 312 (which generically represents an application that can provide information about status and errors to the control center 150 for display to users) and "Data Quality Graph" 314 (which is an executable graph for determining data quality), provide information that the reporter 158 passes to the control center 150.

Figure 3B:
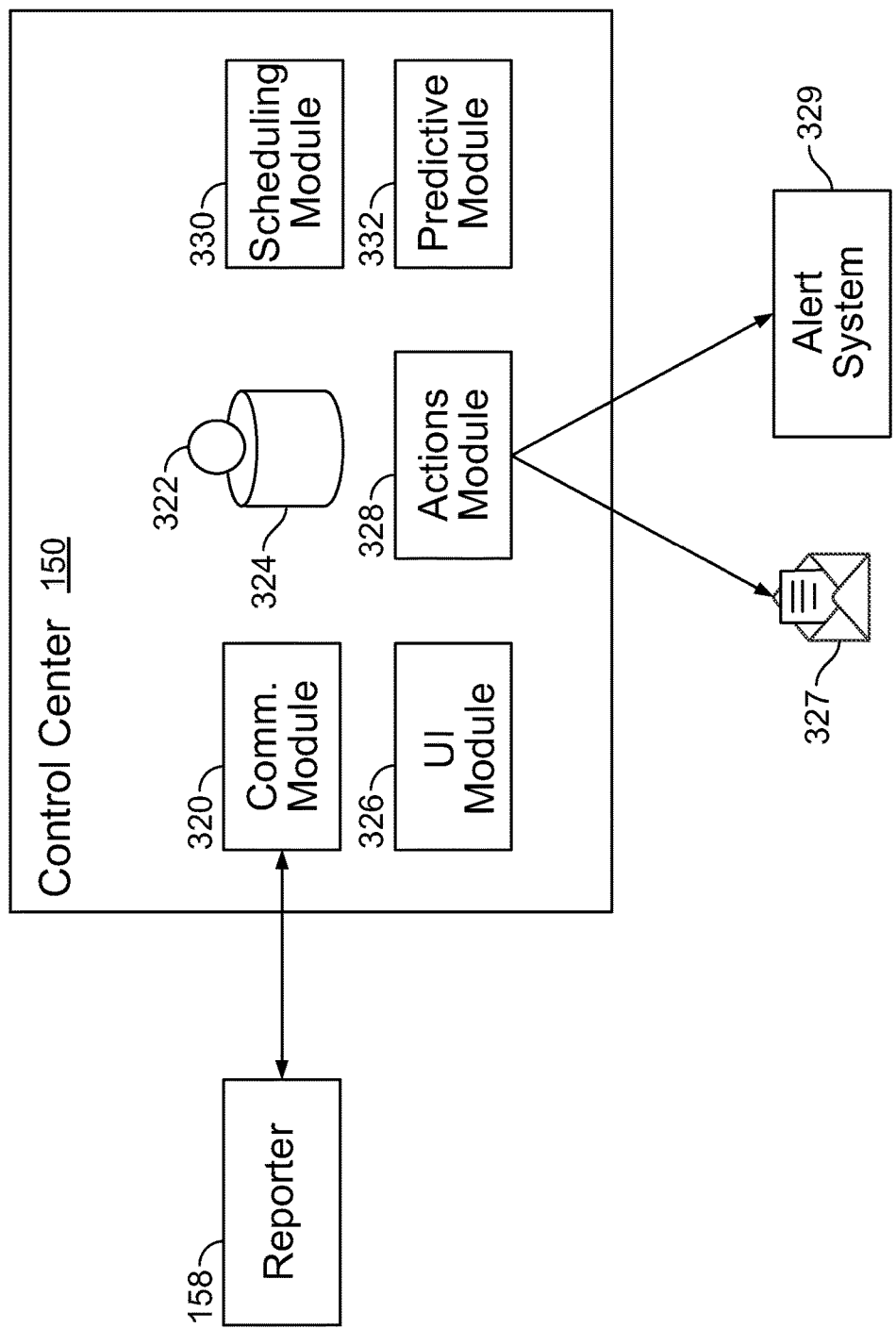
FIG. 3B is a block diagram of a control center.

Referring to FIG. 3B, a communication module 320 of the control center 150 receives the information from the reporter 158. Communication with the reporter 158 allows the control center 150 to monitor the real time status of the components of the processing environment 100. The status of a component can include the operational availability of the component, such as whether the component is online or offline, whether there is an error or warning condition associated with the component, or other indicators of the operational availability of the component. The status of a component can also include performance metrics associated with the component. In some cases, real time status information 322 about a component can be stored in a storage, such as a status database 324, at specified times (e.g., once per second, once per minute, at the start or completion of a job, or at another time). The stored status information 322 can be used to track the historical status of the component.

A user interface module 326 of the control center 150 enables information about the status of one or more of the components of the processing environment 100 to be displayed on the user interface 156. As discussed below, information can be displayed on the user interface 156 to draw attention to interrelationships among the various components of the processing environment 100 such that the user 102 can understand, e.g., how the status of one component affects or may affect the status or performance of another component.

An actions module 328 of the control center 150 enables the user 102 to perform actions related to one or more of the components of the processing environment 100. Examples of specific actions are described below. In some examples, the user 102 can set up a rule for an automated action to be taken responsive to the occurrence of a performance issue. For instance, the actions module 328 can compare a status indicator or a performance metric to a predefined criterion to determine whether an automated action is to be taken. A predefined criterion can include a specific status (e.g., a component that is offline or online with an error or warning condition) or can include a threshold performance metric (e.g., a host operating within 5% of the CPU limit or a job whose elapsed time is longer than a threshold time). Automated actions can include, e.g., sending an alert 327, such as an email or text message to a specified recipient; triggering a failure notification system 329 or a customer-specific alert system; or another type of automated action. In one example of a rule for an automated action, the user 102 can specify that the control center 150 shows the presence of an issue (e.g., by using an icon that indicates an issue) in the user interface 156 if a license key for a product is within one month of expiration, and an email is to be sent to a product administrator for the product if the license key is within one week of expiration. Upon seeing the icon that indicates an issue, the user 102 can investigate to find out more about the issue. In one example of a rule for an automated action, the user 102 can specify that a detailed error message is to be sent automatically by text message to a systems administrator if a host goes offline, and that a notification email is to be sent to other people whose work involves the offline host. In one example of a rule for an automated action, an alert email can be sent to someone with job scheduling responsibilities if a certain percentage of jobs executing on a particular host last longer than a threshold duration. Other rules and automated actions are also possible.

Examples of real time status metrics that can be monitored and displayed for a host 104 include, for instance:

The operational status of the host—e.g., whether the host is online, online with an error or warning condition, or offline. In some cases, the control center 150 can monitor details related to the operational status of the host, such as whether the host is offline for scheduled maintenance or offline due to a fault (e.g., a disk failure).

The total central processing unit (CPU) usage of the host.

The total available memory or used memory of the host.

The number of file systems associated with the host.

The total available disk space or used disk space of the file system.

A number of jobs running on the host.

The identity of each of the jobs running on the host.

The CPU usage, memory usage, or both by each of the jobs running on the host.

A number of applications running on the host.

The identity of each of the applications running on the host.

The CPU usage, memory usage, or both by each of the applications running on the host.

The CPU usage, memory usage, or both for the particular user 102 relative to the maximum amount of CPU or memory licensed by the user.

The status (e.g., expiration date) of a license key stored on the host and the identity of the applications associated with that license key.

Parameters of the operating system

The number of CPUs

The CPU class

The CPU speed

Other real time status metrics can also be monitored. In some examples, the user 102 can define custom status metrics to be monitored by the control center 150.

The control center 150 can also maintain information that allows for tracking of historical status metrics for a host 104. For instance, the control center 150 can maintain information that allows for tracking of the historical operational status of host, such as the percentage of time a host 104 has been offline over a given period of time, the number of error or warning conditions a host 104 has experienced over a given period of time, or other indicators of historical operational status. The control center 150 can maintain information that allows for the tracking of an average or total number of jobs 108 run on the host 104, an average or total number of applications 106 operating on the host 104, the average or maximum CPU load of the host 104, an average or minimum available memory of the host 104, or other indicators of historical status of the host 104. While some of this type of information may be found in one or more log files for a host 104, the integrated display provided by the control center 150 makes the information more readily accessible and more easily understood, thus allowing a person with less specific technical knowledge to access and analyze the historical status metrics for a host 104.

Examples of actions that can be taken related to a host include, for instance:
- Review issues, such as issues giving rise to error or warning conditions.
- Establish, edit, or suspend automated alerts.
- Return a license key stored on the host.
- Install a new license key.
- Show the information about what products have license keys for the host.
- Stop monitoring a host's status and metrics with the control center, and resume monitoring the host again at some later time.
- Drop the host from the control center completely, so that it is no longer known to the control center.

The control center 150 can also enable actions other than those listed above.

Examples of real time status metrics that can be monitored and displayed for a product or service include, for instance:
- The status of the license key for the product or service—e.g., valid, valid but approaching expiration, or expired.
- The identity of a key server on which the license key for the product or service is published.
- The identity of the host on which the product or service is operating.
- The number of jobs utilizing the product or service.
- The identity of the jobs utilizing the product or service.
- The location of a configuration file for the product or service.
- The location of a log file for the product or service.
- The identity of any services utilized by the product or service.
- The status of each of the services utilized by the product or service (e.g., online, online with an error or warning condition, or offline).
- The identity and status of any component related to the product or service.

Other real time status metrics can also be monitored. In some examples, the user 102 can define custom status metrics to be monitored by the control center 150.

Examples of actions that can be taken related to a product or service include, for instance:
- Start or stop the application.
- Navigate to functionality for requesting and installing a new license key on the host.
- Review issues, such as issues giving rise to error or warning conditions.
- View a log file for the product or service.
- View or edit a configuration file for the product or service.
- Establish, edit, or suspend automated alerts.
- Install, upgrade, or uninstall the product or service.
- Migrate the application to a different host.
- Open and switch to the product's own user interface.

The control center 150 can also enable actions other than those listed above.

Providing the ability to take action on license keys or configuration files simplifies the task of administering and maintaining products or services. For instance, often, monitoring the status of the license key for a product or service can be challenging for a user. In addition, if a license key for a product or service expires, it can be difficult for a user to diagnose the reason why the product or service no longer operates. The ability to easily view the status of the license key, acquire information that can be used to renew the license key, and enter a new license key makes license key related work much less labor intensive for the user. The configuration file for an application can also be difficult to locate and difficult to understand. By providing a direct link to the configuration file from the user interface 156 of the control center 150, the configuration file becomes more readily accessible to a broader range of users.

Providing the ability to install, upgrade, or uninstall a product or service can simplify the process of installation, upgrade, or uninstallation, e.g., such that a less technically skilled user can install, upgrade, or uninstall a product or service. The installation, upgrade, or uninstallation of a product or service can be facilitated by information possessed by the control center 150 about requirements of the product or service, such as dependencies on Java version or disk space requirements. The installation, upgrade, or uninstallation can be facilitated by information possessed by the control center 150 about relationships between the product or service to be installed, upgraded, or uninstalled, e.g., information about which other products, services, jobs, or other components may be impacted by the installation, upgrade, or uninstallation.

Examples of real time status metrics that can be monitored and displayed for a job 108 include, for instance:
- The real time operational status of the job—e.g., whether the job is running, stopped or paused, waiting to run, or completed.
- The start time, elapsed time (if ongoing), or end time (if completed) of the job.
- Whether the total elapsed time of the job met a target processing time (e.g., a service level agreement (SLA)) for the job.
- The identity of the host on which the job is running
- The CPU usage by the job.
- The identity of any products or services utilized by the job.
- The type of data output by the job.
- The location of the data output by the job.
- The number of records processed during execution of the job.
- The number of records rejected during execution of the job.
- The status of each of the services utilized by the job.

Other real time status metrics can also be monitored. In some examples, the user 102 can define custom status metrics to be monitored by the control center 150.

The control center 150 can also maintain information that allows for tracking of historical status metrics for a job 108. For instance, the control center 150 can maintain information that allows for tracking of the average run time, the average CPU usage, the average number of records rejected, or other historical metrics for a given type of job.

Examples of actions that can be taken related to a job include, for instance:
- Start or stop the job.
- Schedule the job.
- Rerun a job.
- Disable a job so that it will not run.
- Enable a disabled job so that it will run.
- Put a job on hold.
- Release a job from hold.
- Investigate and resolve issues on a job.

Ignore a failed job so that jobs with dependencies on it will run anyway.

View and navigate to any predecessor or successor jobs.

View and navigate to any previous runs of the job.

View and navigate to a parent job, or to any child jobs.

View the queues being used by the job.

View the files being used by the job.

View the resources being used by the job.

View the products and services being used by the job.

The control center can also enable actions other than those listed above.

Figure 18:
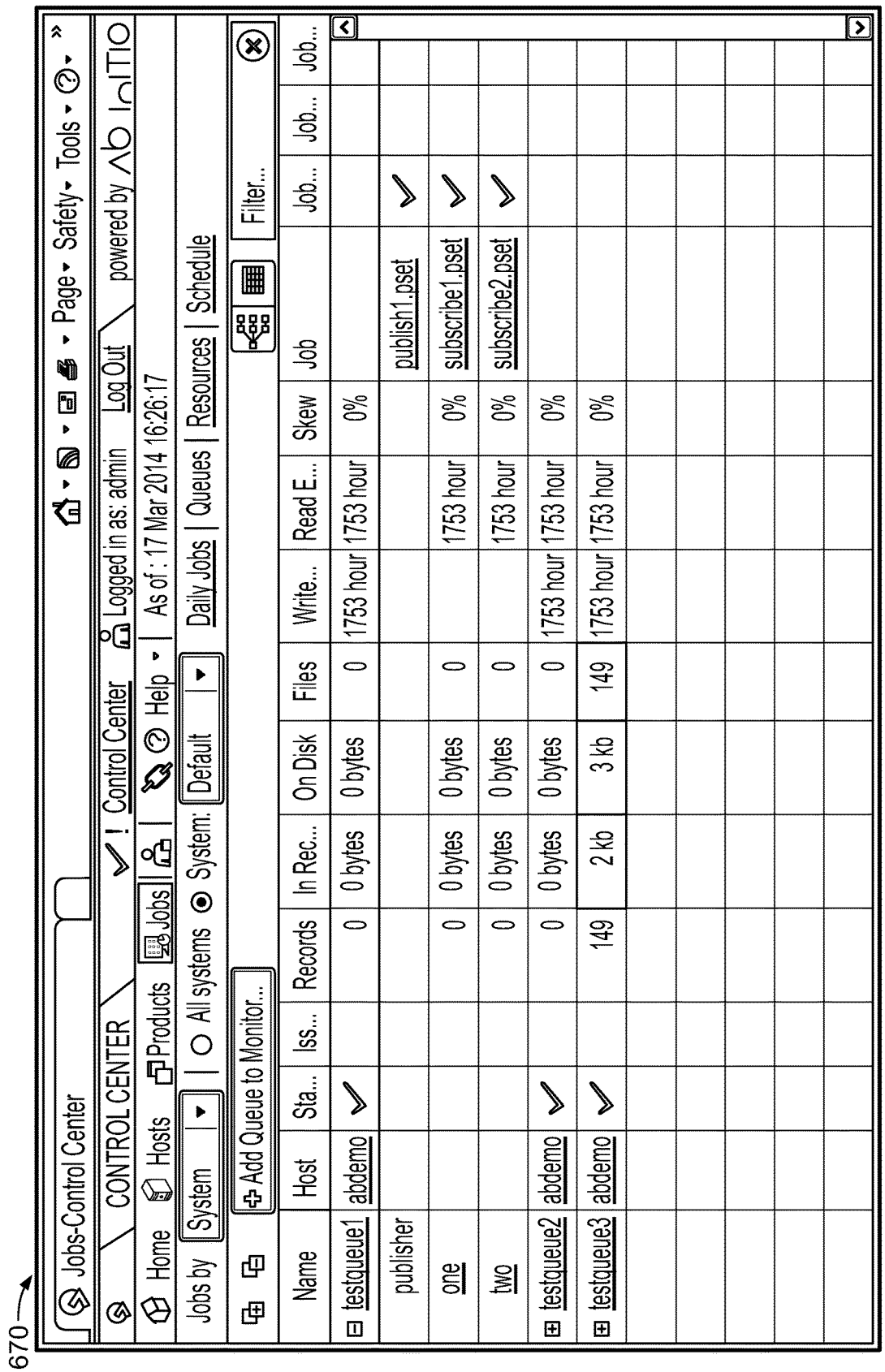
FIGS. 18-20 are screenshots of example user interfaces.
Figure 19:
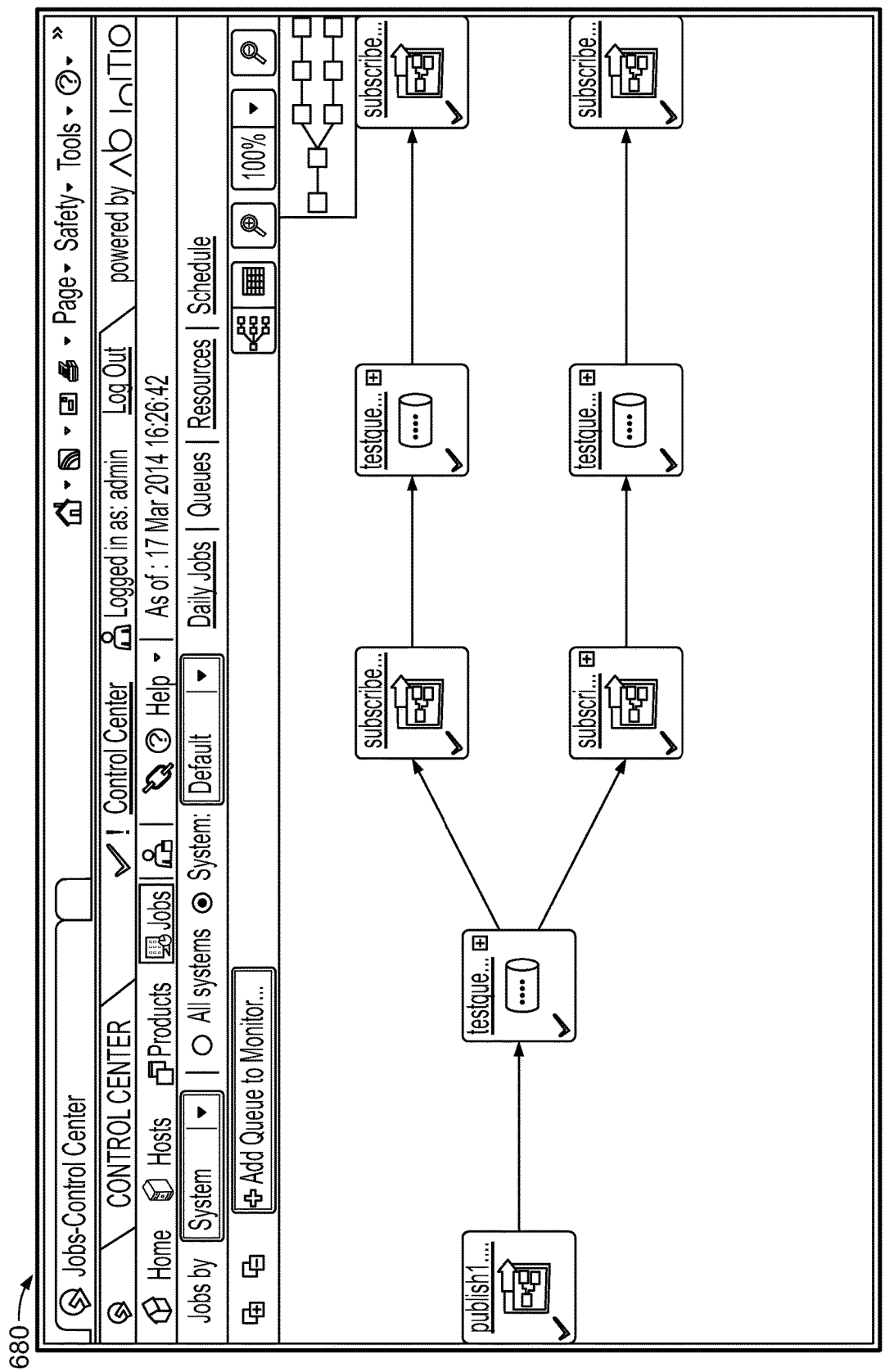

The control center can monitor queues 114 used by jobs. In some implementations, jobs depend on the data passed between data processing components, so knowing queue status gives a user insight into the overall performance of the jobs. As described in more detail below, examples of user interfaces for monitoring queues 114 are shown in FIGS. 18 and 19.

Figure 20:
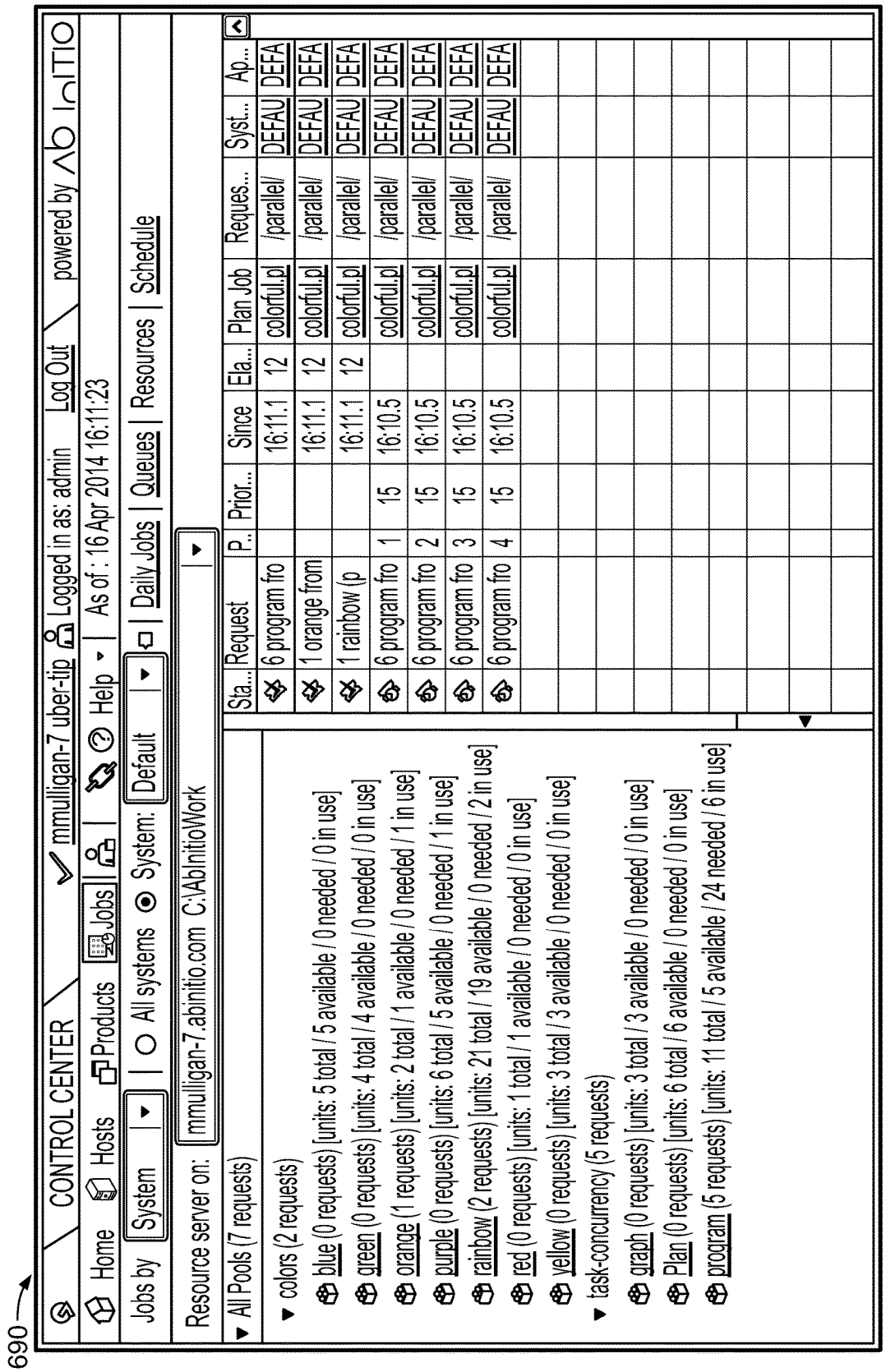

The control center can monitor resources used by jobs. The resources represent some aspect of the processing environment used by a plan. For example, a hardware component, measure, or programmatic object can be defined as a resource. CPU time, processor units, FTP (file transfer protocol) ports, disk capacity, file counts, input streams, and event triggers, and JVM (Java virtual machine) pools are examples of resources. The purpose of defining resources is to balance demand and capacity in the processing environment. Specifically, resources can be used to impose maximum limits and ordering to the loads placed on the system. As described in more detail below, an example user interface for monitoring resources is shown in FIG. 20.

Referring again to FIG. 3B, a scheduling module 330 of the control center 150 enables the user to view and manage the schedule of jobs. For example, the user can use the scheduling module 330 to generate and view sequence dependencies among jobs (e.g., which jobs need to finish (referred to as predecessor jobs) before another job can begin). The user can also specify that the start of a job be dependent on whether a particular file or set of files is present in the processing environment 100, or on the posting of a particular signaling event in the processing environment 100 by another job. The user can also make a job to be a parent job, which runs one or more independent child jobs as part of its data processing tasks. The user can disable a job or enable a previously disabled job. The user can put a job on hold or release a job from hold. In some examples, when a job is disabled or put on hold, other jobs that depend on the disabled or held job are also disabled or put on hold.

The scheduling module 330 can also enable the user 102 to set a deadline for completion of the job, and specify actions or notifications to perform if the job is starting or ending late relative to its deadlines. The user 102 can specify a target elapsed time for the job by creating custom metrics. They can specify that the job run on specific dates, or on a repeating basis (such as every week on specific days (e.g., every Monday), or every month on a particular day, or only on certain months), and at specific times.

The scheduling module 330 enables the user 102 to disable parts of the schedule, or generate new parts of a schedule for review and (if approved) inclusion in the schedule. The control center 150 also maintains historical information for a schedule.

A predictive module 332 of the control center 150 can also proactively predict whether a performance issue may arise in the future based on the real time status information 154 including the amount of data to be processed and the historical information regarding the volume of data processed and stored in the database 324. The real time status information 154 includes information on the status of current jobs and can also be stored in, e.g., the database 324. In one example, the historical status information indicates the average time that each type of job takes to run and the scheduling module 330 has information indicative of a deadline for a particular job and any dependencies of that particular job on other jobs. Based on this information, the predictive module 332 can calculate that some jobs will take longer than usual to complete processing of a larger-than-usual amount of data, and thus can determine whether the particular job is likely to be completed by its deadline. The predictive monitoring module can understand the processing characteristics based on when the job is scheduled (e.g. a Friday job vs. a Monday-Thursday job, or an end-of-quarter job or end-of-year job vs. a daily job).

The predictive module 332 of the control center 150 can also proactively predict whether a performance issue may arise based on the real time status information of what jobs have failed. The predictive module can identify the performance issue that the jobs for which the failed job is a predecessor will be unable to run (stalled).

The information provided by the control center 150 can help the user 102 perform dynamic load balancing, in which information about machine capacities and limits is used to decide which jobs should be scheduled to execute on which machines. In another example of predictive capabilities, the historical status information stored in the database 324 indicates the average CPU usage of each type of job on a particular host and the scheduling module 330 has information indicative of which jobs will be running on that particular host. Based on the number of jobs predicted to be running on that host at a particular time and the average CPU usage of each of those jobs, the predictive module 332 can predict whether there may be a capacity issue on the host. For instance, if an unusually large number of jobs are scheduled to run at the same time on that host, the predictive module 332 may predict that the host performance may be degraded. Similarly, if an unusually large volume of data is being processed by a particular set of jobs, the predictive module 332 may predict capacity issues for hosts on which that set of jobs will be running.

The user interface 156 displays some or all of the status information monitored by the control center 150 and allows the user to take actions related to one or more components of the processing environment 100. In general, status information is displayed and linked on the user interface 156 in a coherent, integrated manner that highlights relationships among the various components of the processing environment 100. Rather than displaying information about each individual component of the processing environment in a vacuum, this display paradigm makes visible or accessible insights into the overlap among the components of the processing environment. With this display paradigm, both the potential contributing factors to a performance issue with a particular component and the potential effects of a performance issue on other components can be understood and addressed.

For instance, with the integrated display of information provided on the user interface 156 of the control center 150, the user 102 can identify those jobs 108 that will be affected if a particular host 104 is taken offline for maintenance. Conversely, the user 102 may notice that certain jobs 108 are running more slowly than expected. Through the user interface 156, the user 102 may be able to determine that these jobs 108 are all running on the same host 104 and that that host 104 is CPU bound or I/O (input-output) bound. In both cases, the user 102 can take action to mitigate any potential performance issues or to resolve actual performance issues. For instance, through the user interface 156 and in response to a notification that a host 104 will be taken offline for scheduled maintenance, the user 102 can temporarily migrate the affected jobs 108 or the applications 106 utilized by those jobs 108 or both onto a different host 108. In the example of the CPU bound or I/O bound host 104, the user may alert a systems administrator to potential capacity problems with that host 104. As described in more detail below, the control center 150 provides user interfaces that allow the user 102 to discover relationships among various components (products, services, and jobs) of the processing environment 100, as shown in FIGS. 21A to 21C, 22, and 23. FIGS. 4-24 are screenshots of an example user interface 156 through which a user can view status information for and relationships among various components of the processing environment 100.

Figure 4:
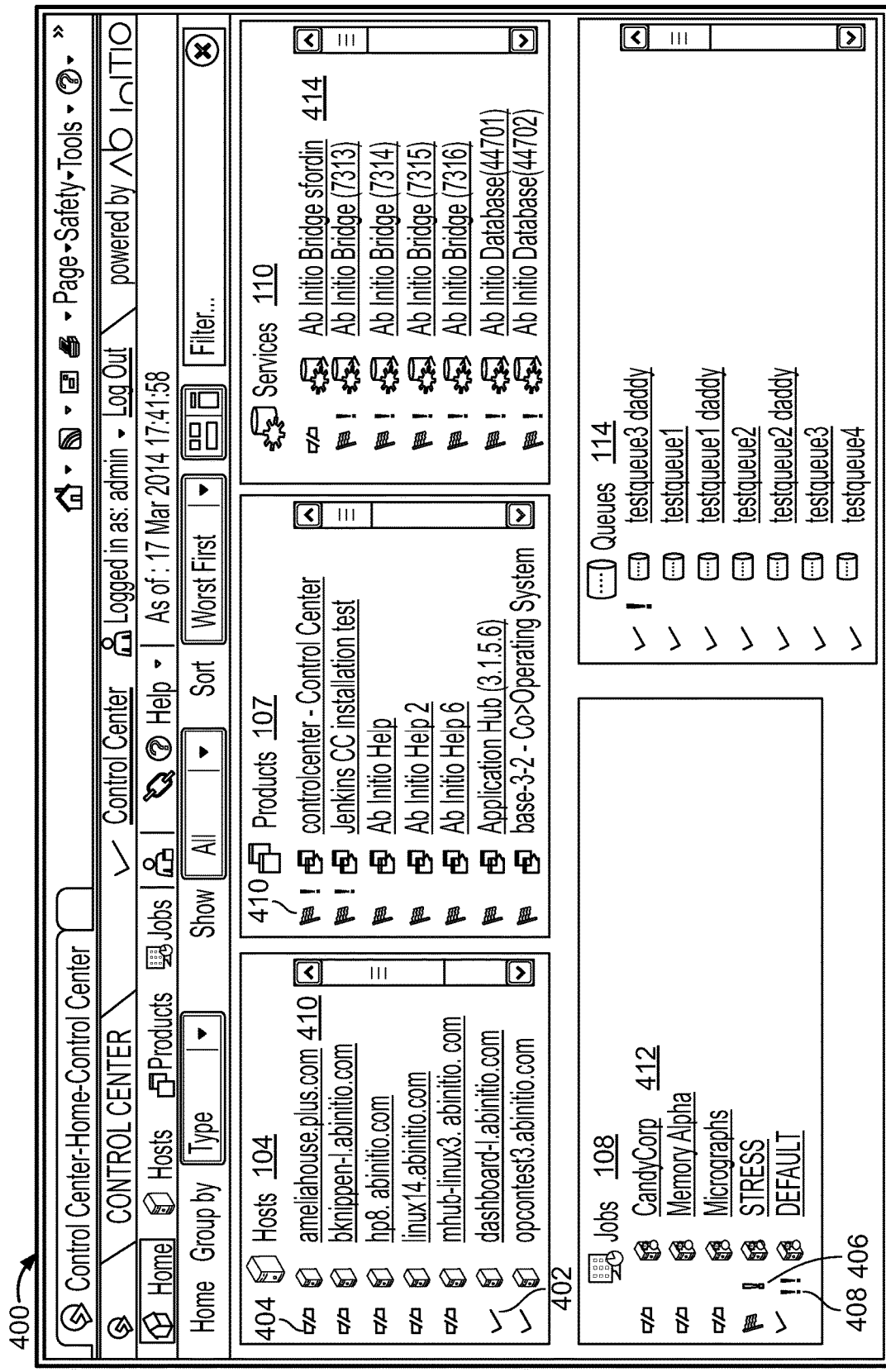

Referring to FIG. 4, a dashboard view 400 of the user interface shows a high-level overview of the basic operational status of some or all of the components of the processing environment. The example dashboard view 400 shows the operational status for the hosts 104, products 106, and jobs 108 in the processing environment. The dashboard view 400 also shows the operational status of services 110 that are utilized by one or more of the products 106 or jobs 108 and the operational status of queues 114 that are utilized by one or more of the jobs 108. While not shown in the example of FIG. 4, in some implementations, the dashboard view may show the operational status of systems in the processing environment. A system is a set of one or more jobs (e.g., one or more graphs or plans that are conceptually related or that together satisfy a common objective). For instance, a system may include those jobs that are related to finance activities, fraud detection, credit card processing, or other types of business organizations or business functions.

The dashboard view 400 communicates enough information to help a user see where there may be potential issues in the processing environment and where to begin an investigation into those issues. There are two levels of status feedback for each of the components monitored by the control center 150. The first level is a mapping to a "common status," e.g., the status icons used on the dashboard view and elsewhere. The second level of status feedback for a component is specific to the type of component. For example, a service with a common status of "Not OK" may have an individual status of "Not running". Both levels of status feedback are visible when the user hovers a pointer over the operational status icon.

The example dashboard view 400 indicates whether a component has status information (indicated by a checkmark 402) or the status is unavailable (indicated by a disconnect symbol 404). The dashboard view can flag issues (indicated by flags 410) and indicate the severity of an issue associated with the component by using, e.g., an exclamation mark 406 or double exclamation marks 408. A double exclamation mark may indicate a "fatal condition," such as when a product's key has expired, or a system's schedule has not been automatically generated as expected. The user can click a pointer (e.g., a mouse pointer) on the name of the component to access a pop-up window (sometimes also referred to as an information bubble) to access more detailed status information for one of the components, as discussed below. The user can also select (e.g., by clicking or tapping) a type of component (e.g., "Hosts" 104) or a specific component to access another display screen with more detailed status information.

The detailed status information can provide insights into the overall status of the processing environment and help the user identify the salient issues and decide how to proceed with an investigation into any issues. For instance, the example dashboard view 400 indicates that the host ameliahouse.plus.com 410, the job CandyCorp 412, and the Ab Initio Bridge sfordin service 414 are offline or otherwise unavailable. No further details are displayed on the dashboard view. The user can hover over the status icon to obtain more detailed status information, or click on the name "CandyCorp" to obtain an information bubble with more detailed status information about the CandyCorp job 412. If the information bubble indicates that the CandyCorp job 412 is set to run on the host ameliahouse.plus.com 410, then the user can determine that CandyCorp job 412 may be having problems simply because the host ameliahouse.plus.com 410 is having problems. Similarly, if the user determines that the product or service that is not executing properly is on a particular host that is having problems, then the user can determine that the product or service may be having problems because that host is having problems. If the information bubble indicates that CandyCorp 412 is set to run on a host that is online, the user can determine that the issues affecting CandyCorp 412 may be different than the issues affecting the host ameliahouse.plus.com 410.

Figure 5:
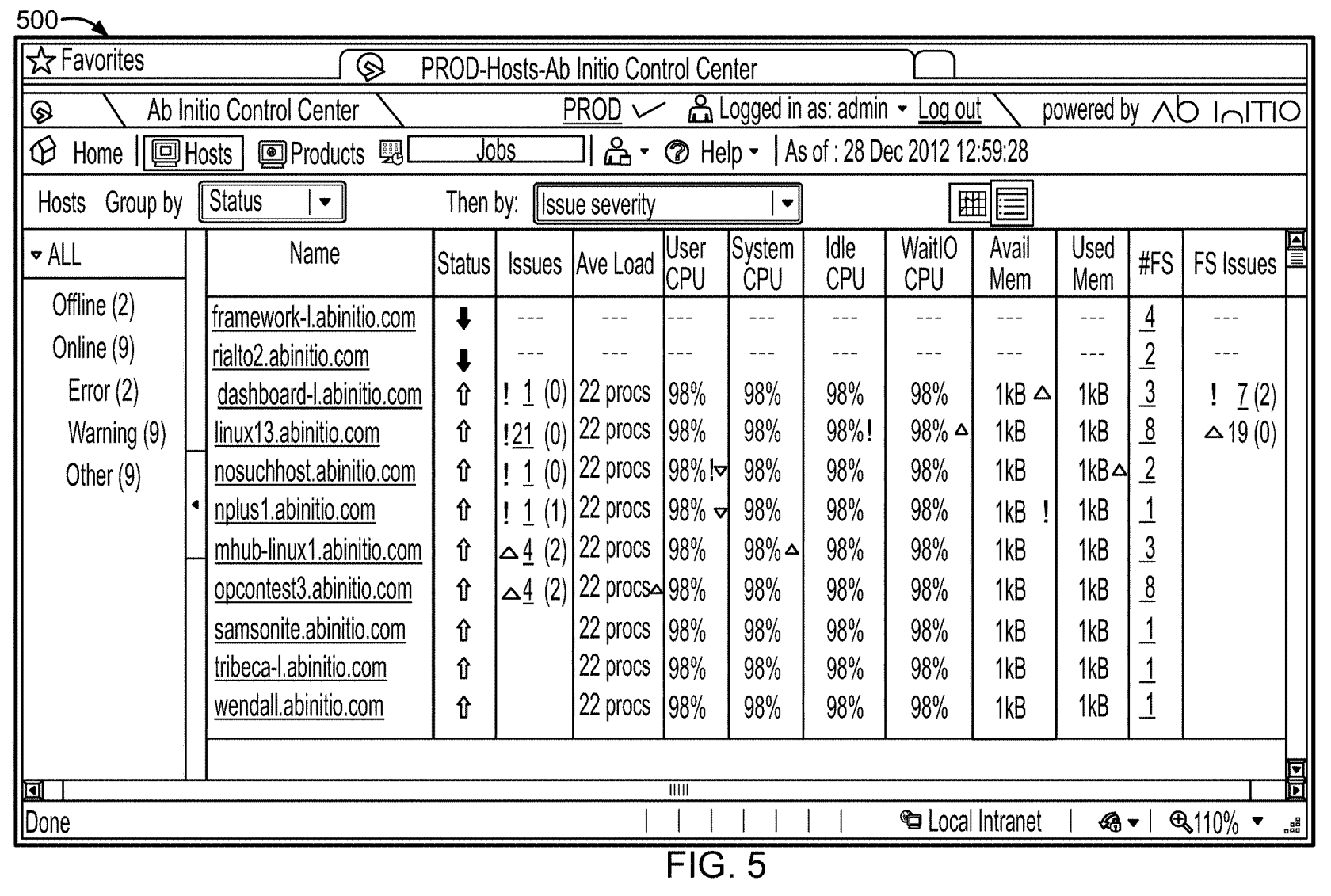
Figure 6:
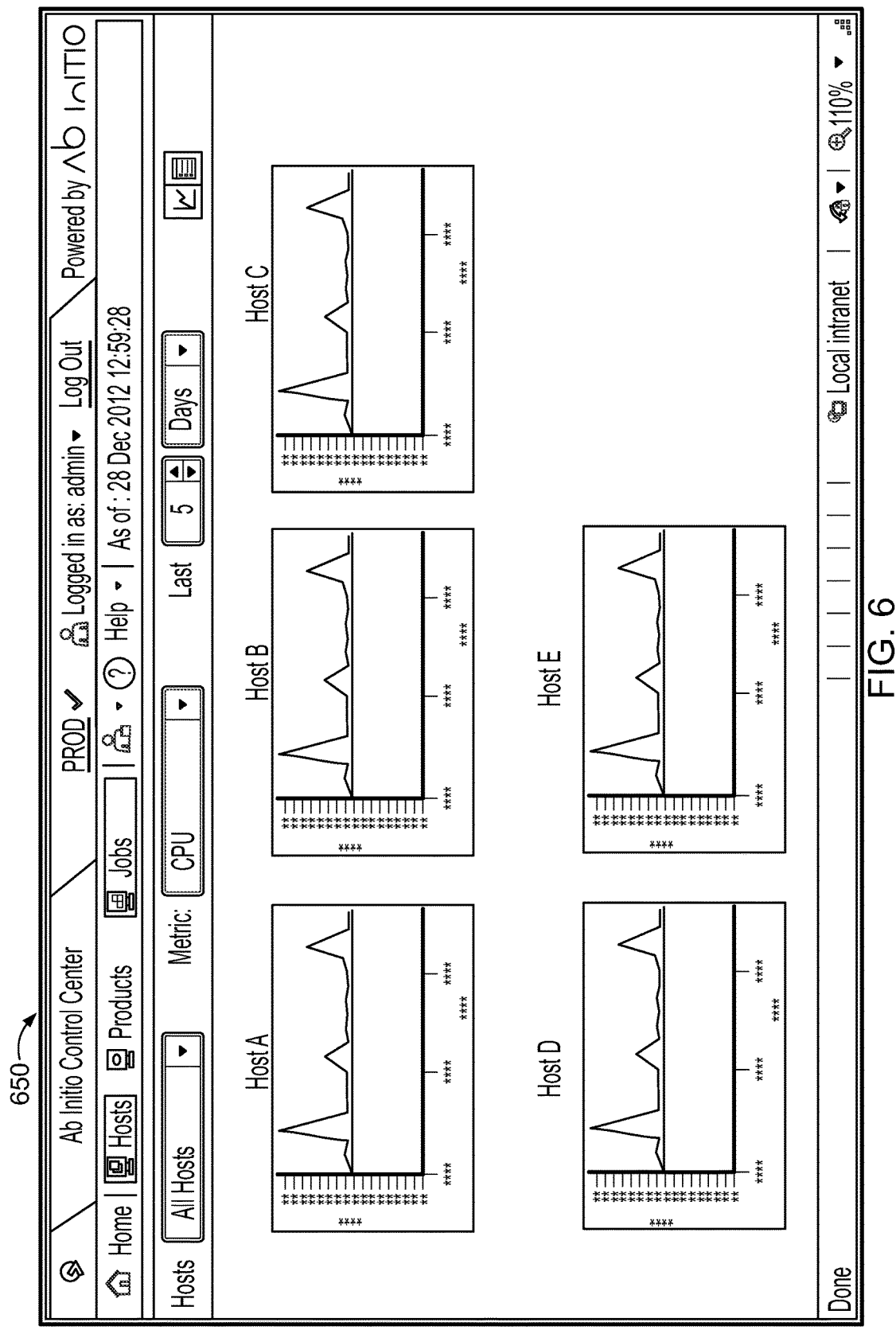

From the dashboard view 400, the user can pivot into views focused on the various components of the processing environment. For instance, the user can select (e.g., by clicking or tapping) the "Host" section to pivot into a view that provides detailed status information for the hosts in the processing environment. Similarly, the user can select the "Products" section to pivot into a view that provides detailed status information for the products in the processing environment. A view that is focused on a particular type of component can also provide information about one or more other types of components, but from a point of view that is focused on the original type of component. For instance, a view that provides status information for hosts can also provide information about jobs, products, or services running on one or more of the hosts. A view that provides status information for products can also provide information about the hosts on which one or more of the products are running, the services that one or more of the products may utilize, or the jobs that are running using one or more of the products. FIGS. 5-7 show example views that provide status information focused on hosts. FIGS. 8-11 show example views that provide status information focused on products. FIGS. 12 and 13 show example views that provide status information focused on jobs.

Referring to FIG. 5, a host summary view 500 displays performance metrics associated with one or more of the hosts in the processing environment and can indicate which performance metric, if any, has given rise to an error or warning condition associated with a host. For instance, the information displayed in the host summary view 500 indicates that the error condition associated with the host dashboard-1 is related to a file system (FS) issue and that the warning condition associated with the host opcontest3 is related to a process running on the host. In some examples, the user 102 can click on the name of a host to access an information bubble that includes further details about that host, such as the type of processor (e.g., a multi-core processor or a virtual machine), a CPU capacity of the host, or other details. The user can apply filters to display only a subset of the hosts, e.g., only the hosts that are offline, only the hosts that are online, only the hosts that are online with an error condition, or another subset of the hosts.

The host summary view 500 provides information that helps the user to understand the nature or severity of an issue associated with a host. This detailed understanding of an issue can help inform the user's response to the issue. For instance, if a user observes that the CPU loads of the hosts are unbalanced and that there is a host with an error or warning condition related to its CPU usage, the user may determine that a load rebalance is appropriate.

Referring to FIG. 6, a metric history view 650 shows the history of one or more selected metrics for one or more of the hosts in the processing environment. For instance, the example metric history view 650 shows the CPU usage history for the last 5 days for hosts A-E. The information displayed in the metric history view 650 can be useful, e.g., in understanding the factors in a past problem (e.g., in understanding why yesterday's jobs generally did not meet their SLA). The information displayed in the metric history view 650 can also be useful, e.g., for business decisions. For instance, seeing that the historical CPU usage of a particular host is often close to its maximum licensed limit may prompt a decision to license more capacity on that host.

Referring to FIG. 7, a jobs view 700 shows performance metrics for one or more jobs associated with one or more of the hosts in the processing environment. The user can apply filters to display only a subset of all of the jobs in the processing environment, e.g., only the jobs associated with a particular host, only the jobs associated with a particular host and having a particular type of issue, or another subset of the jobs. For instance, the example jobs view 700 shows jobs that are associated with Host B and that have SLA issues. In some examples, the user can click on the name of a particular job to access an information bubble with more detailed information about that job.

For each job, performance metrics such as start time, elapsed time, CPU usage, operational status (e.g., running, stopped, waiting, scheduled, completed, or another operational status), error or warning conditions, or other performance metrics can be displayed on the jobs view 700. These performance metrics can provide the user with insight into the status of the jobs and the relationships among job status and host status. For instance, the example jobs view 700 shows 200 jobs on host B that have SLA issues, which may lead the user to investigate whether there is a CPU or I/O issue with host B. Conversely, if the user knows that there is an issue with host B, the user can access the jobs view 700 to identify the jobs on host B that may be affected by that issue.

Figure 8:
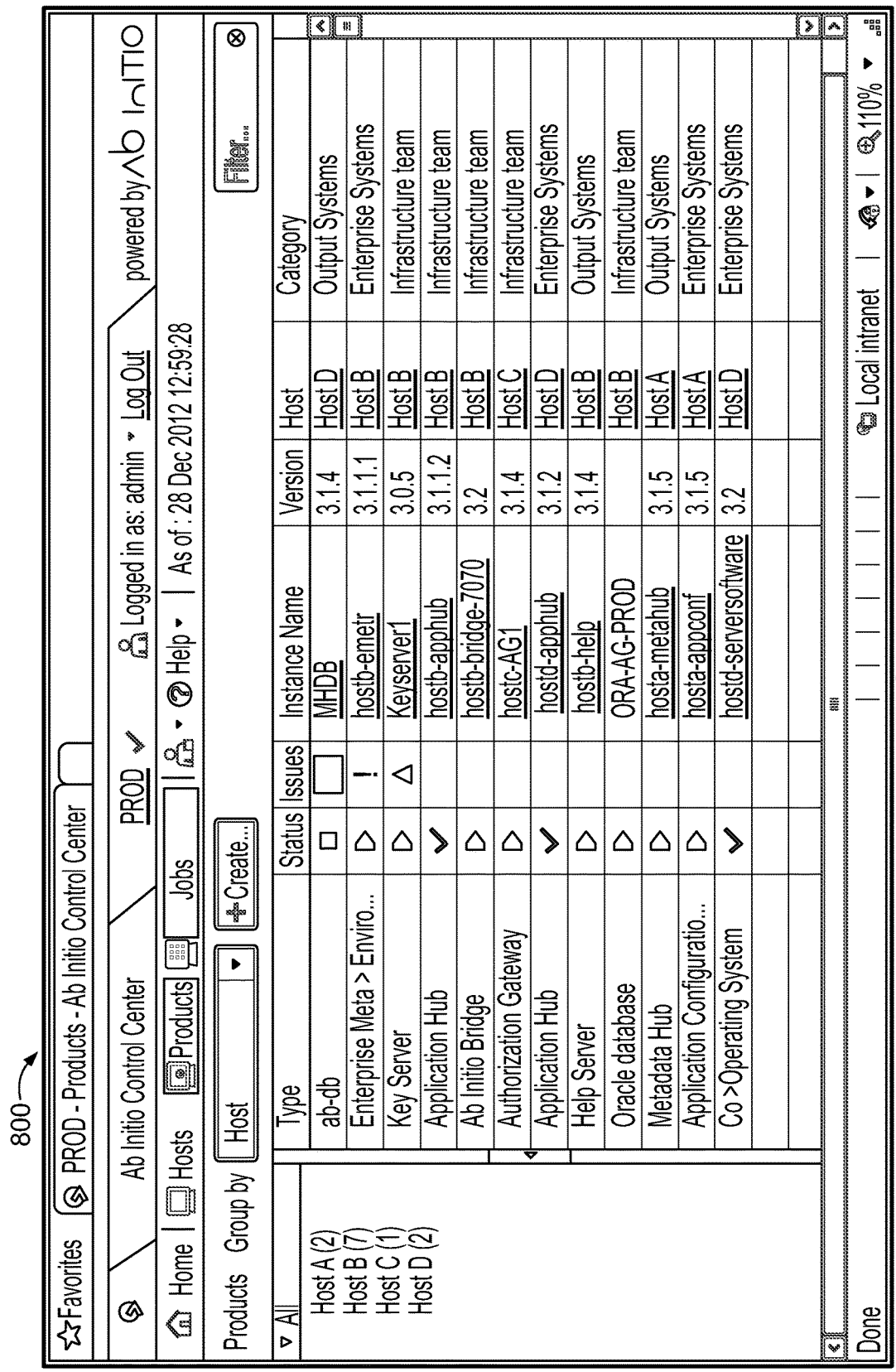

Referring to FIG. 8, in a product focused view, a products area 800 shows status information for one or more products or services in the processing environment. For instance, the products area 800 can show the operational status of a product (e.g., running, stopped, or another operational status), any error or warning conditions associated with the product, the instance name or version of the product, the host with which each product is associated, or other information. In the example products area 800, all products and services on all hosts are displayed; the user can also apply filters to display only products and/or services associated with a particular host.

Figure 27A:
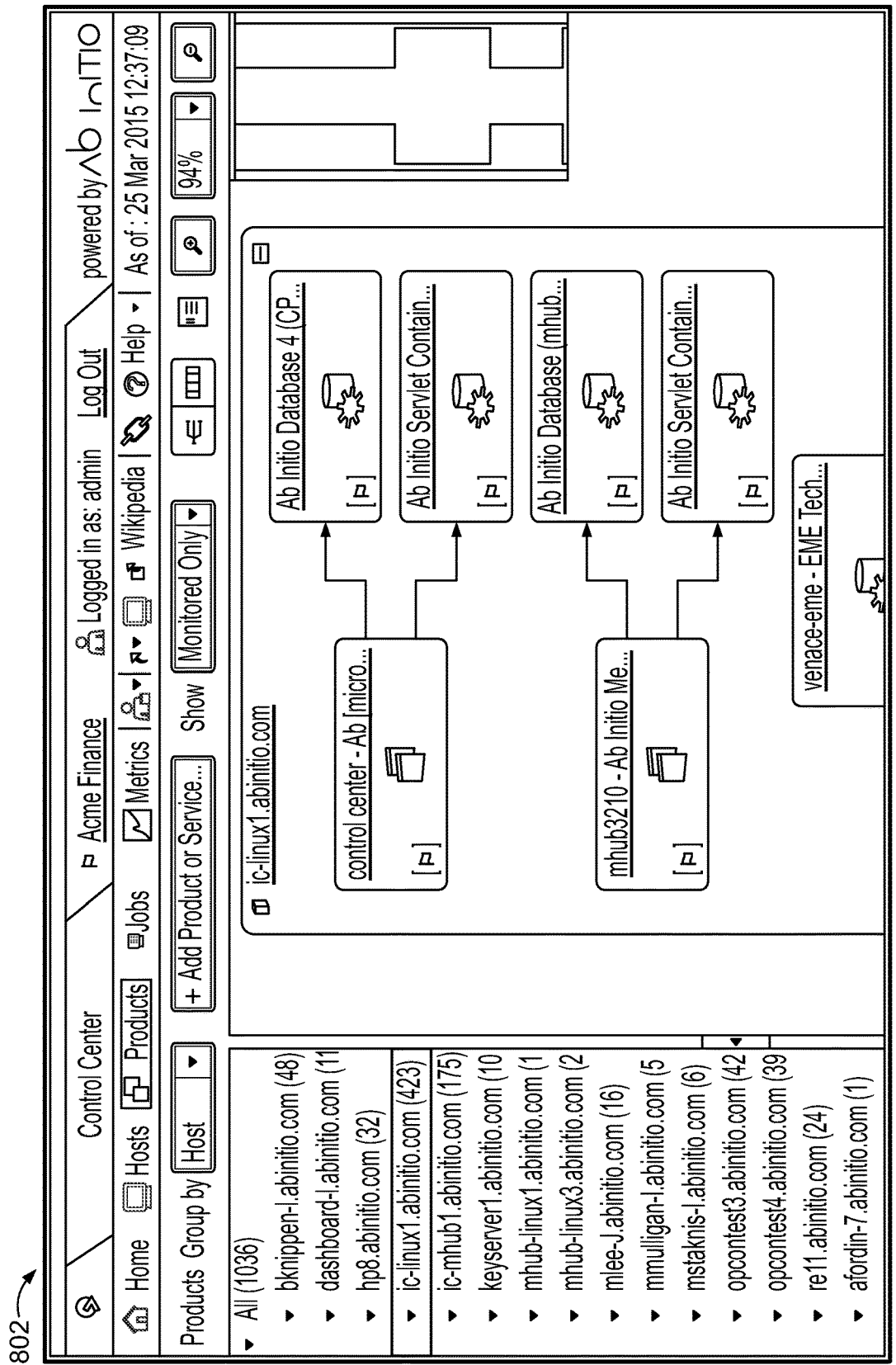
FIGS. 27A and 27B are screenshots of example user interfaces.
Figure 27B:
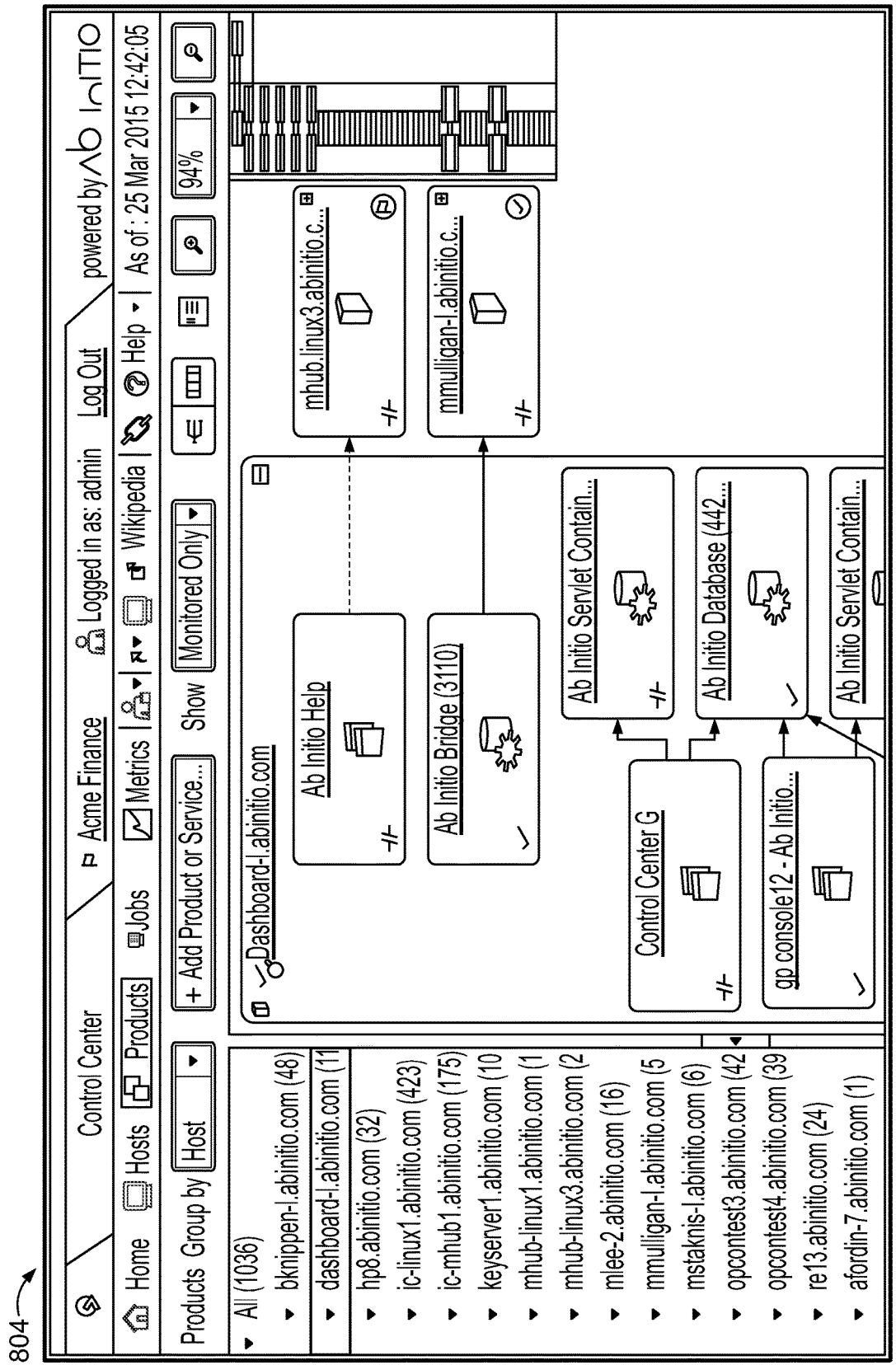

Referring to FIGS. 27A and 27B, product focused views can show relationship diagrams 802, 804, respectively, indicative of the relationships between products and services. In FIG. 27A, the relationship diagram shows relationships between products and services on the same host. In FIG. 27B, the relationship diagram shows relationships between products and services on different hosts.

Referring to FIGS. 9A and 9B, from the products area 800, the user can click on the name of an instance of a particular product to access an information bubble with more detailed information about the product and actions that are available to the user for that product or instance. For instance, FIG. 9A shows an information bubble 900 with detailed information about an instance of the product Metadata Hub. For instance, the information bubble 900 shows the location (e.g., URL) of the product and the host of the product. The information bubble 900 also provides access to actions that the user can carry out, such as editing or configuring the product, stopping the execution of the instance, upgrading the product, or other actions. FIG. 9B shows an information bubble 910 with detailed information about an instance of the product Application Hub, including a list of other products that are connected to the instance of Application Hub.

In some cases, the actions available through the information bubbles 900, 910 are actions that may be performed by a sophisticated technical user. For instance, knowledge of the location and format of configuration files or log files, or knowledge of the specifics of how to migrate a product onto a different processor, is generally important to carry out these tasks. By making these actions easily accessible in the user interface of the control center, a broader range of less technically skilled users may be empowered to carry out a wider range of systems administration tasks.

Figure 10:
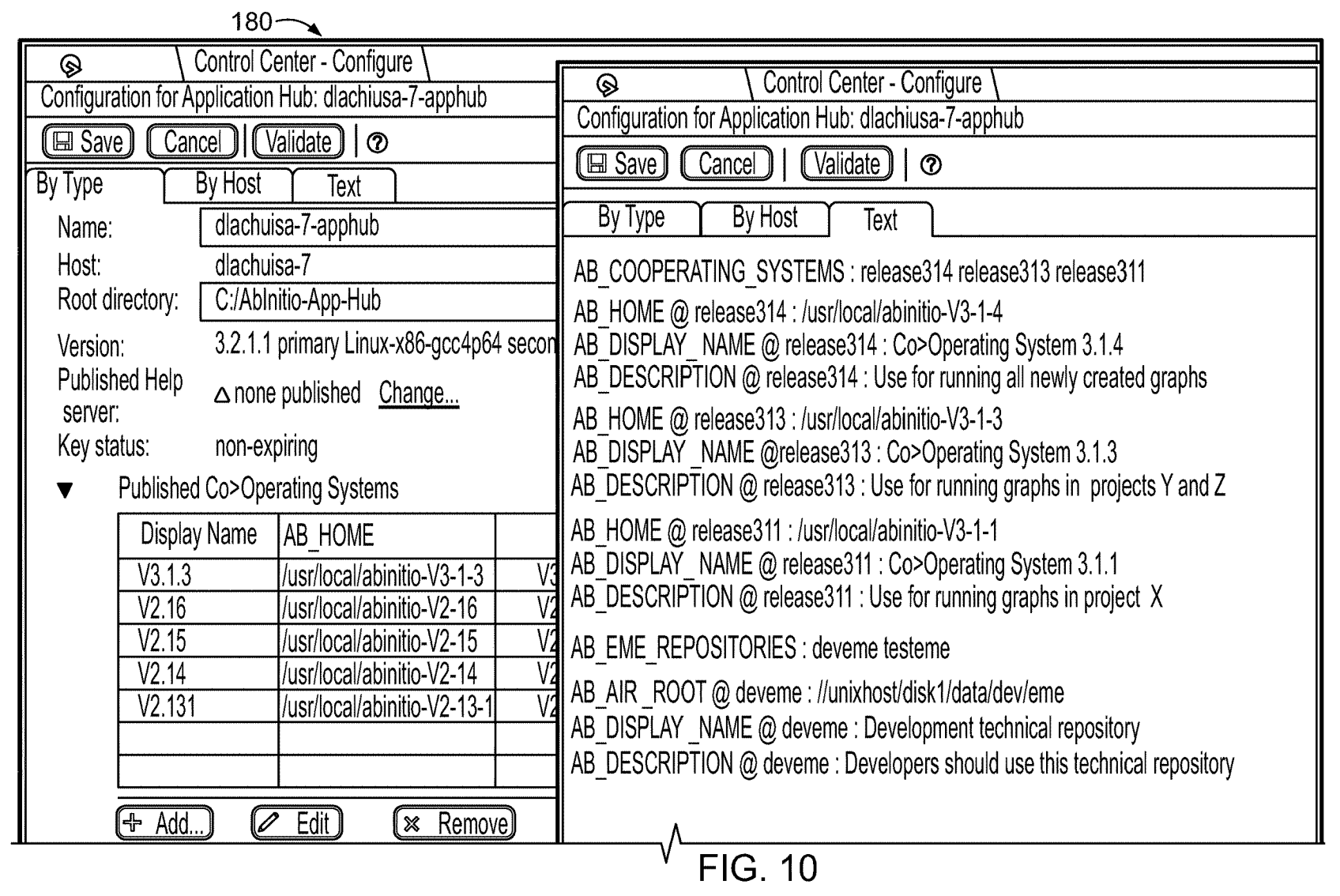

For instance, referring to FIG. 10, a configuration screen 180 is displayed in response to a user selecting the "Configure" action in the information bubble 910 of FIG. 9B. No specific knowledge of where the configuration files are located is necessary to access the configuration screen 190. Thus, the ability to configure the Application Hub product is made accessible to users with a broad range of abilities and technical knowledge.

Referring to FIGS. 11A and 11B, from the products area 800, the user can click on the name of a host associated with an instance of a particular application to access an information bubble 190 with more detailed information about the host and actions that are available to the user for that host. These host information bubbles can provide the user with insight into the relationships among hosts and products. For instance, the information bubble 190 shows that a key stored on Host B expires on Dec. 31, 2013, and that four keyed products 192 are associated with that host. The information bubble 190 also shows real time and historical performance metrics associated with the host. In addition, the information bubble 190 enables the user to carry out actions associated with the host, such as returning a key or installing a new key.

Figure 12A:
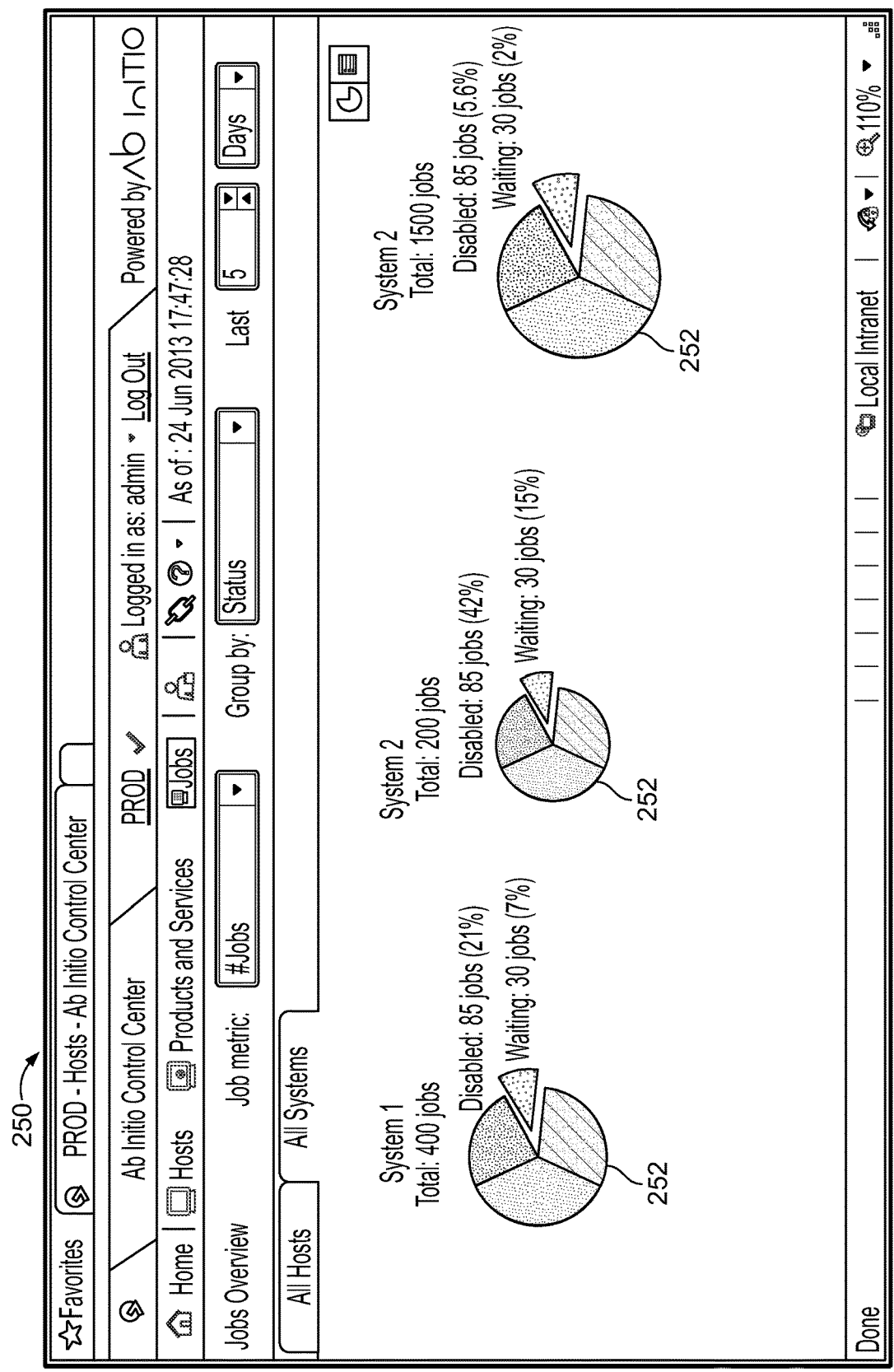

Referring to FIGS. 12A and 12B, in a jobs-focused view, a graphical display 250 of job status per system in the processing environment can be displayed. In the example of FIG. 12A, job status is displayed in the form of pie graphs 252. Each pie 252 corresponds to the jobs on a single system. For instance, the number or percentage of jobs that are running, scheduled, waiting, or disabled, or with another status can be displayed. Clicking on a slice of one of the pies 252 can produce a tooltip or can show text that gives more information about the jobs categorized into that slice. In the example of FIG. 12B, job status information can also be provided in a tabular display 260. In the tabular display 260, a user can click on an indicator 262 of issues related to jobs in a particular system to see a tooltip or show text with information related to those issues. The user can also click on a name 264 of the system to see an information bubble with information related to the system, or can click on a number 266 of jobs with a particular status to see an information bubble with information about the jobs with that status. These information bubbles can provide the user with insights into relationships between the status of one or more jobs and the status of one or more systems. For instance, the tabular display 260 indicates that most jobs on the Candy-Corp system are running, indicating that CandyCorp is likely not experiencing any serious issues. However, most jobs on the Finance system are waiting, indicating that there may be an issue related to a component associated with the Finance system, e.g., a CPU or I/O issue with a host associated with Finance.

Figure 12C:
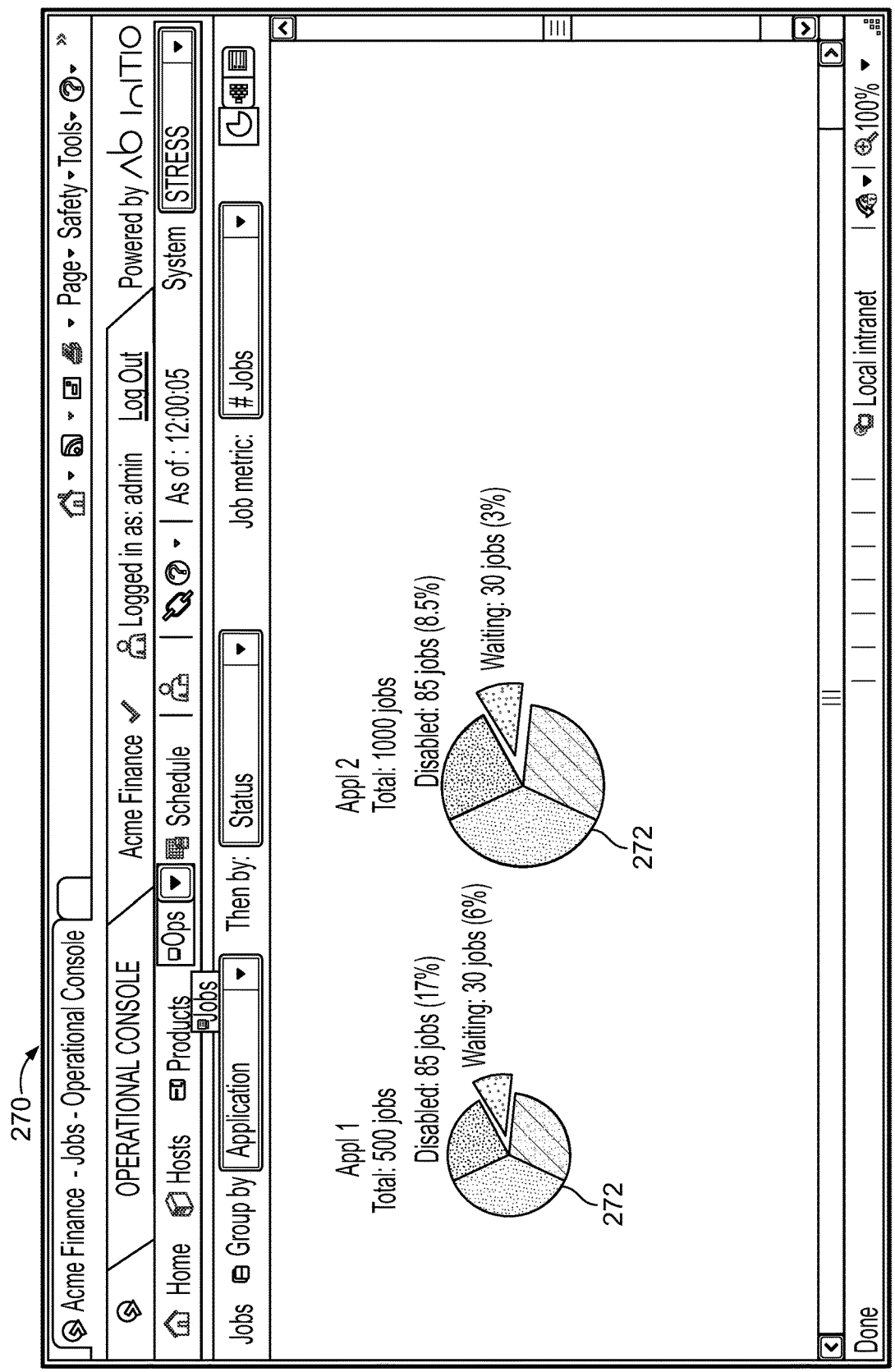

Referring to FIG. 12C, the user can also view a graphical display 270 of the job status per application in a single system. Each pie 272 corresponds to the jobs associated with a single application. For instance, for the jobs associated with each application, the number or percentage of jobs that are running, scheduled, waiting, or disabled, or with another status can be displayed. This view can provide the user with insights into relationships between jobs and applications.

Figure 12D:
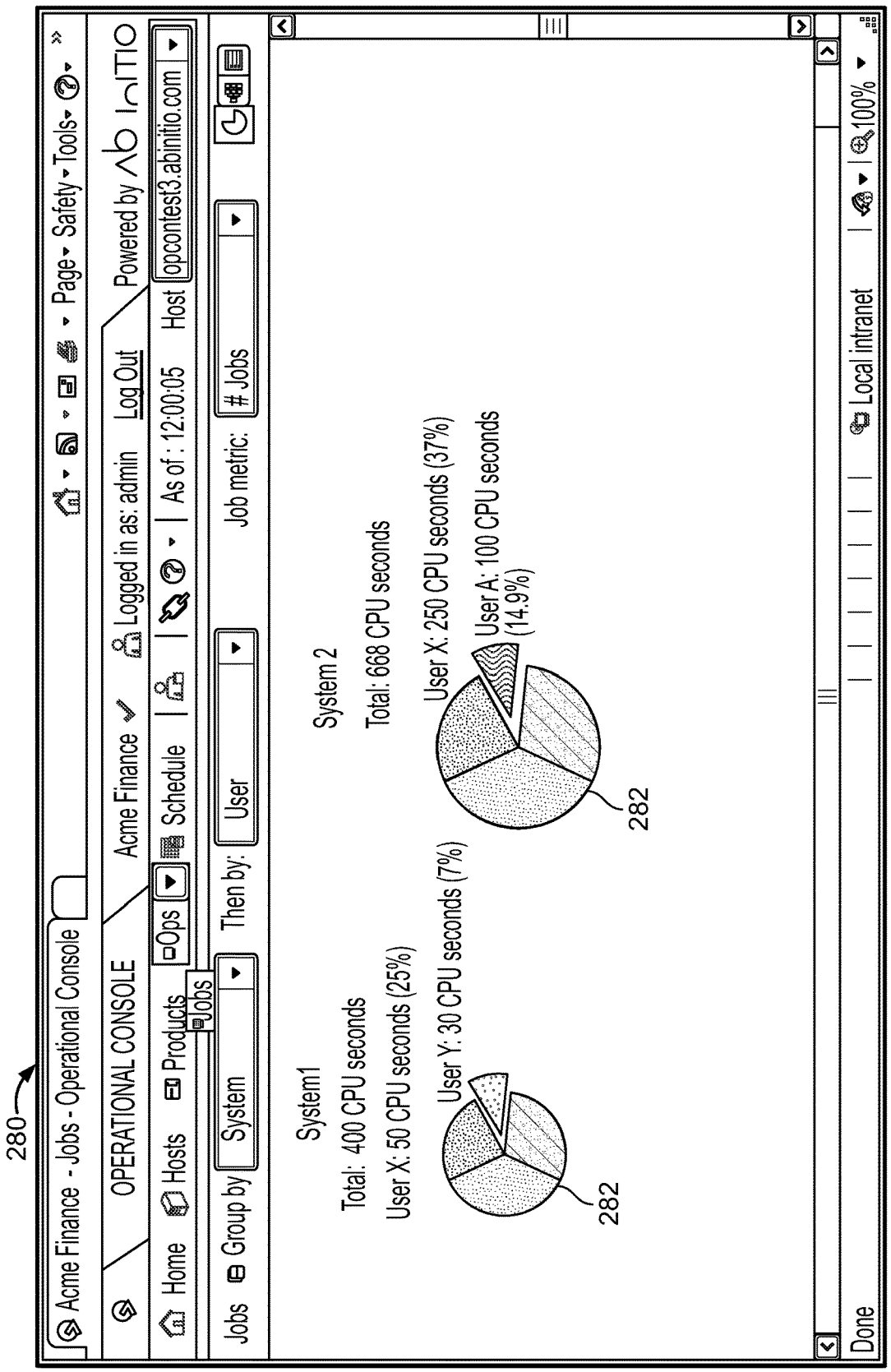

Referring to FIG. 12D, the user can also view a graphical display 280 of the job status for jobs associated with users within a system. Each pie 282 corresponds to the jobs associated with a single system and each slice of each pie 282 corresponds to the jobs associated with a particular user.

Figure 13A:
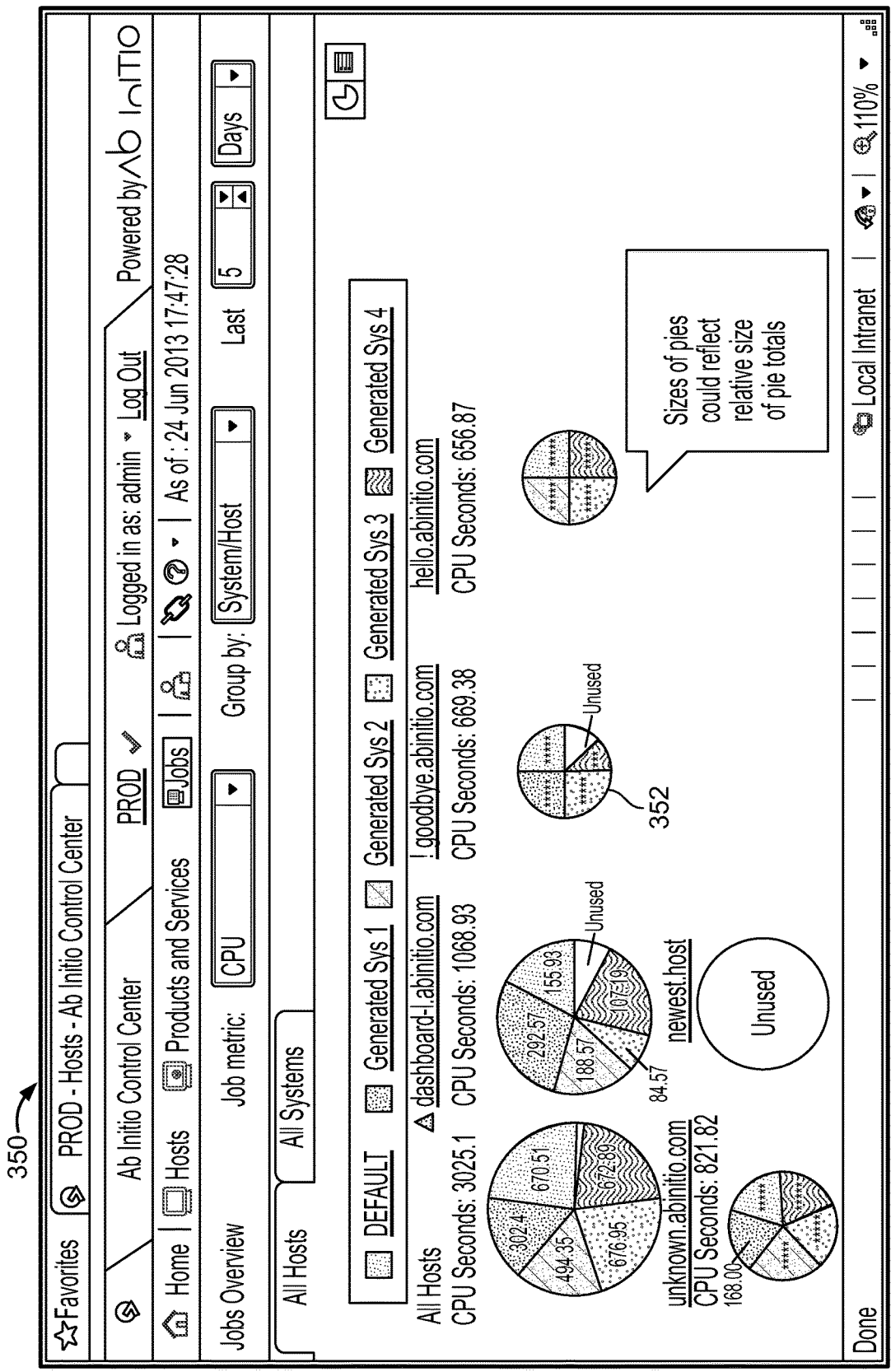

Referring to FIGS. 13A and 13B, a graphical display 350 of job status per host can be displayed. Each pie 352 corresponds to the jobs associated with a single host. In the example graphical display 350 of FIG. 13A, the size of a particular pie relative to the size of the other pies reflects the relative number of jobs represented by that pie. Similar information can also be provided in a tabular display 360, as shown in FIG. 13B. In the tabular display 360, a user can click on an indicator 362 of issues related to jobs associated with a particular host to see a tooltip or show text with information related to those issues. The user can also click on a name 364 of a host to see a tooltip or show text with information related to the host.

Other displays of information can also be provided that highlight relationships among various components of the processing environment.

Figure 14A:
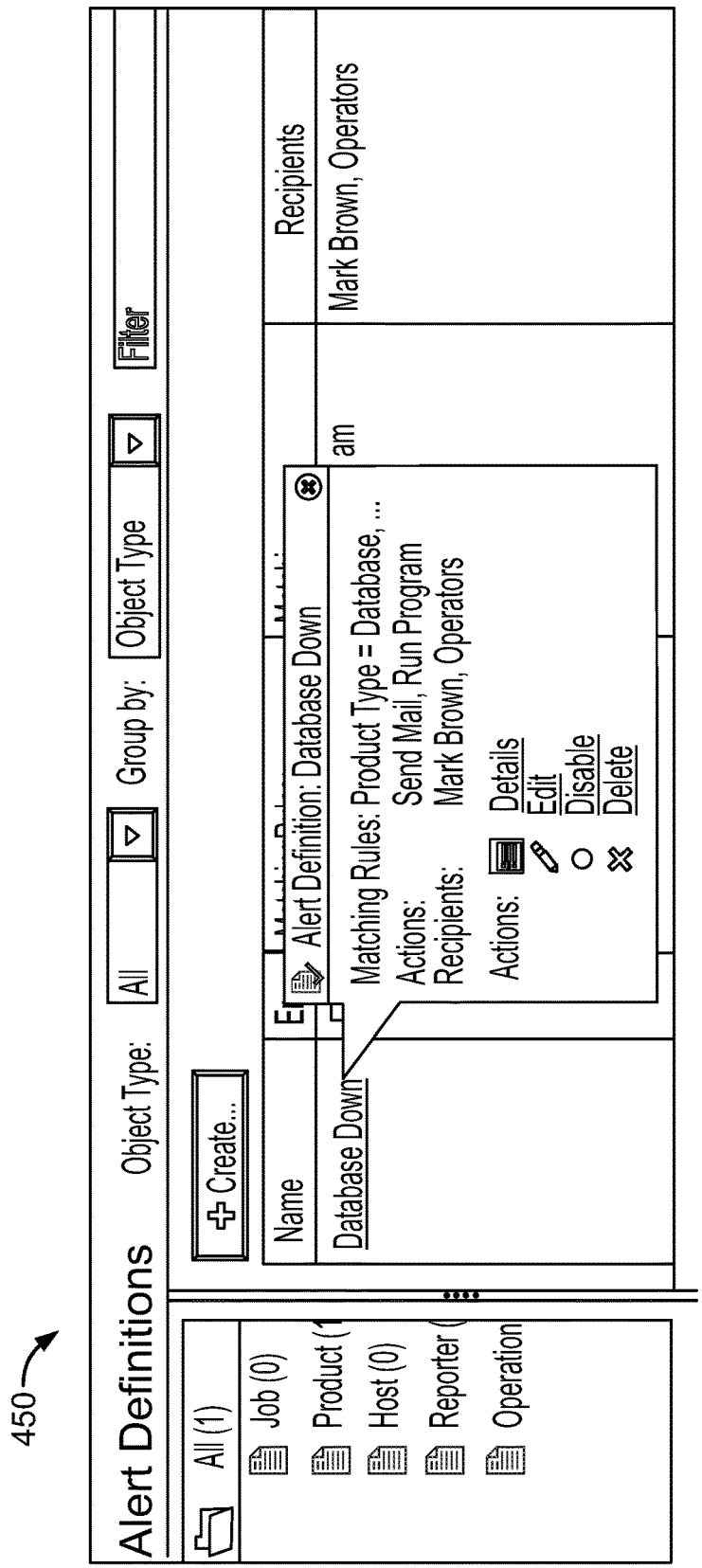
Figure 14B:
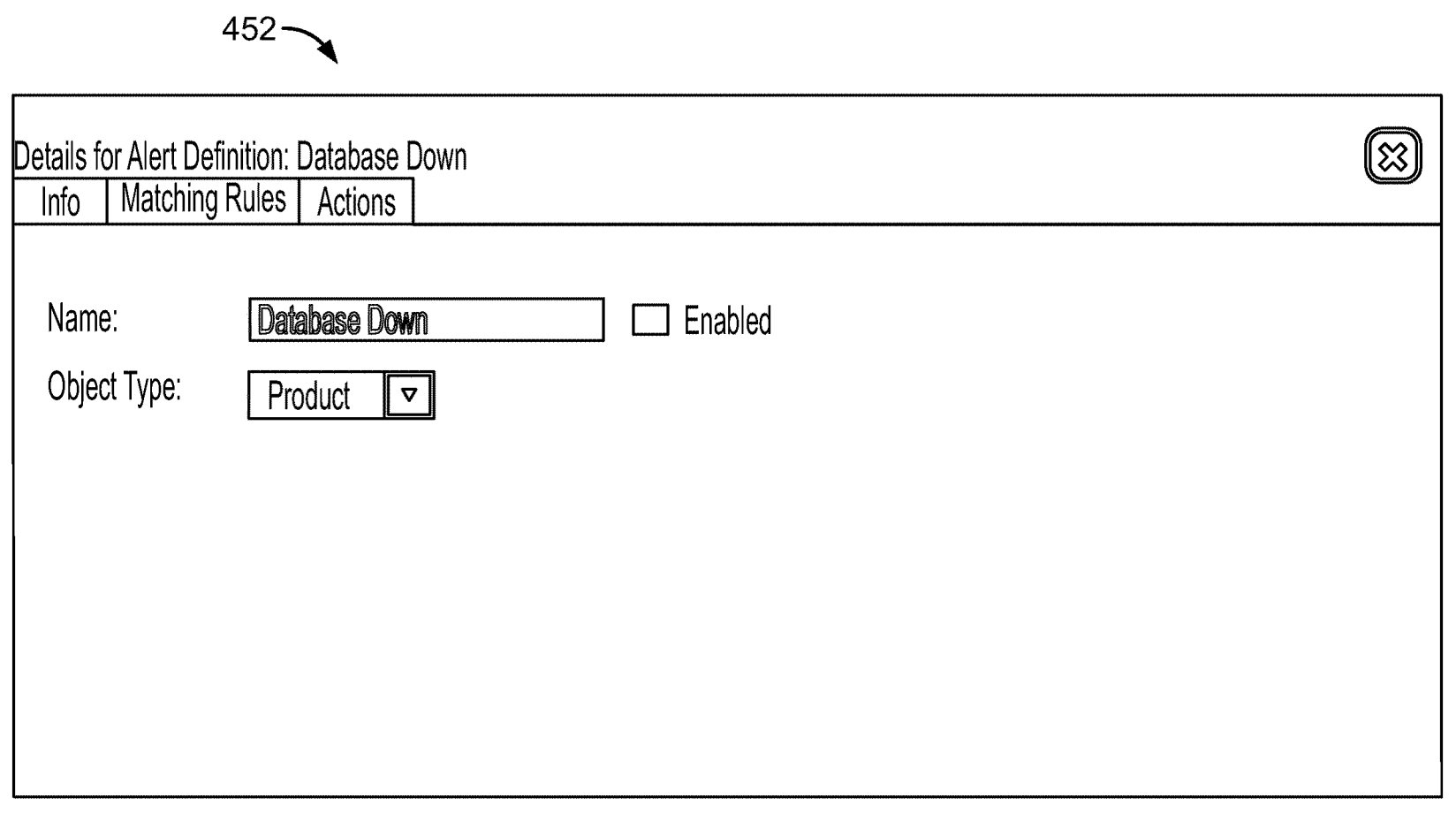
Figure 14C:
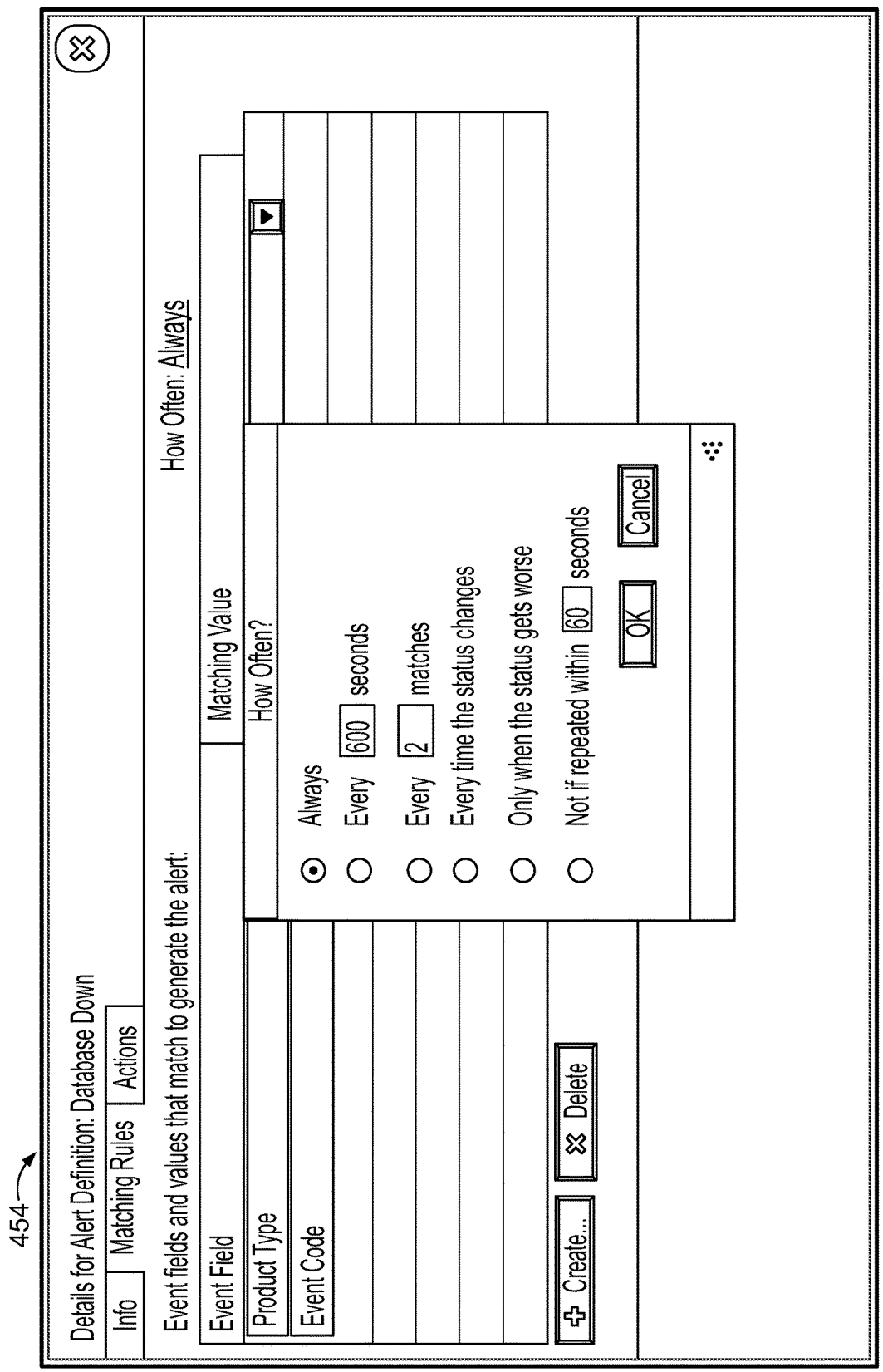
Figure 14E:
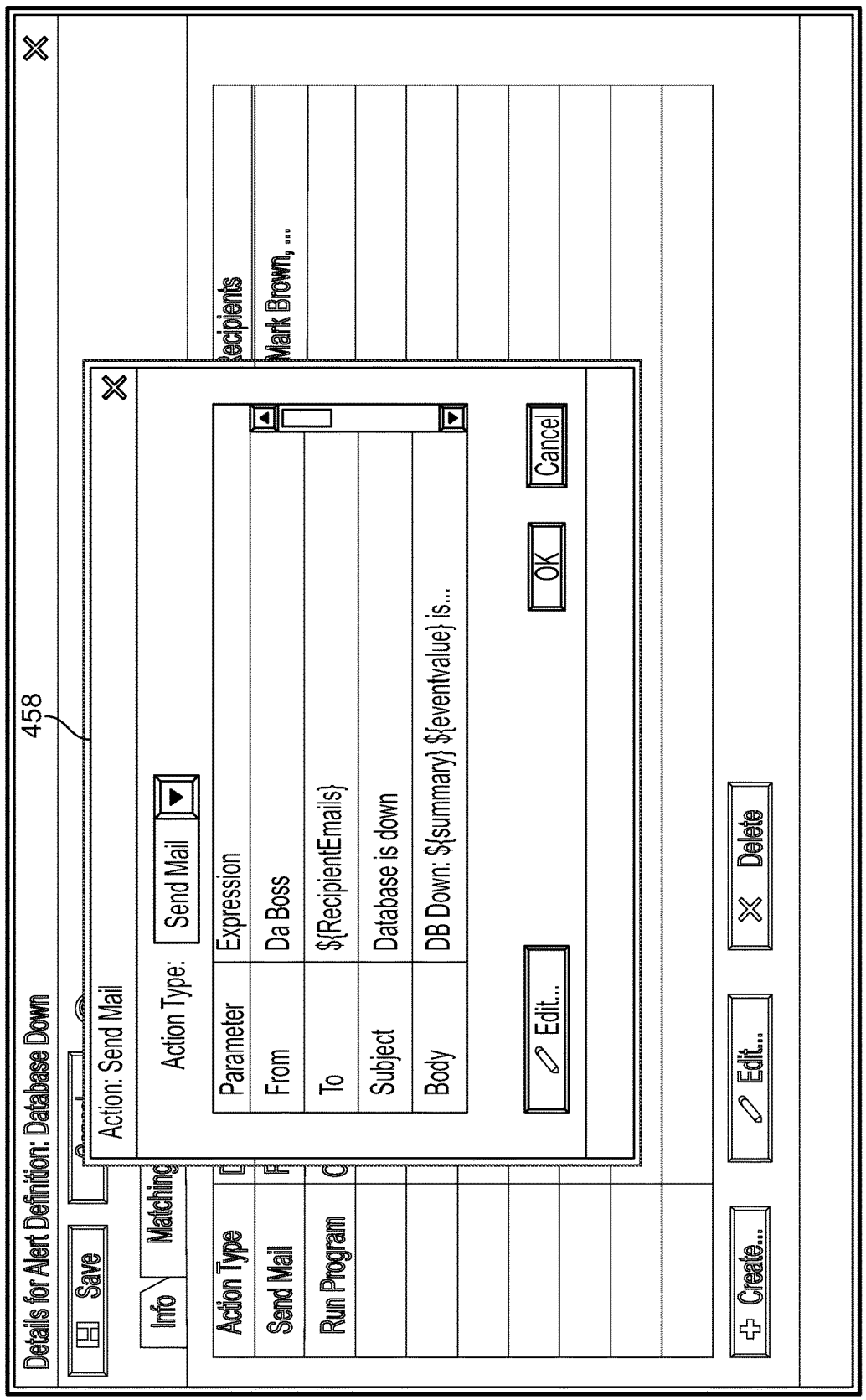

Referring to FIGS. 14A-14C, a user can manage automated alerts through the user interface of the control center. Referring to FIG. 14A, in an information view 450, the user can name an alert and specify the type of component associated with the alert. Referring to FIG. 14B, in an info tab 452, the user can specify information for the alert, such as a product type that will trigger the alert, an event code (e.g., a type of error or warning) that will trigger the alert, and a constraint on how often to trigger an automated action associated with the alert. Referring to FIG. 14C, in a rules tab 454, the user can specify one or more rules defining event fields and values that when matched trigger the alert. Referring to FIG. 14D, in an actions tab 456, the user can specify one or more actions to be carried out when the alert is triggered. For instance, the user can direct the control center to send an email or a text message with specified parameter values, run a program (e.g., a fault detection program), or take another action. Referring to FIG. 14E, in an information view 458, the user can specify details of the action. In this example, the action is "Send Mail," and the user can specify parameters for the action, such as sender name, recipient name, subject line, and body of text.

Figure 15A:
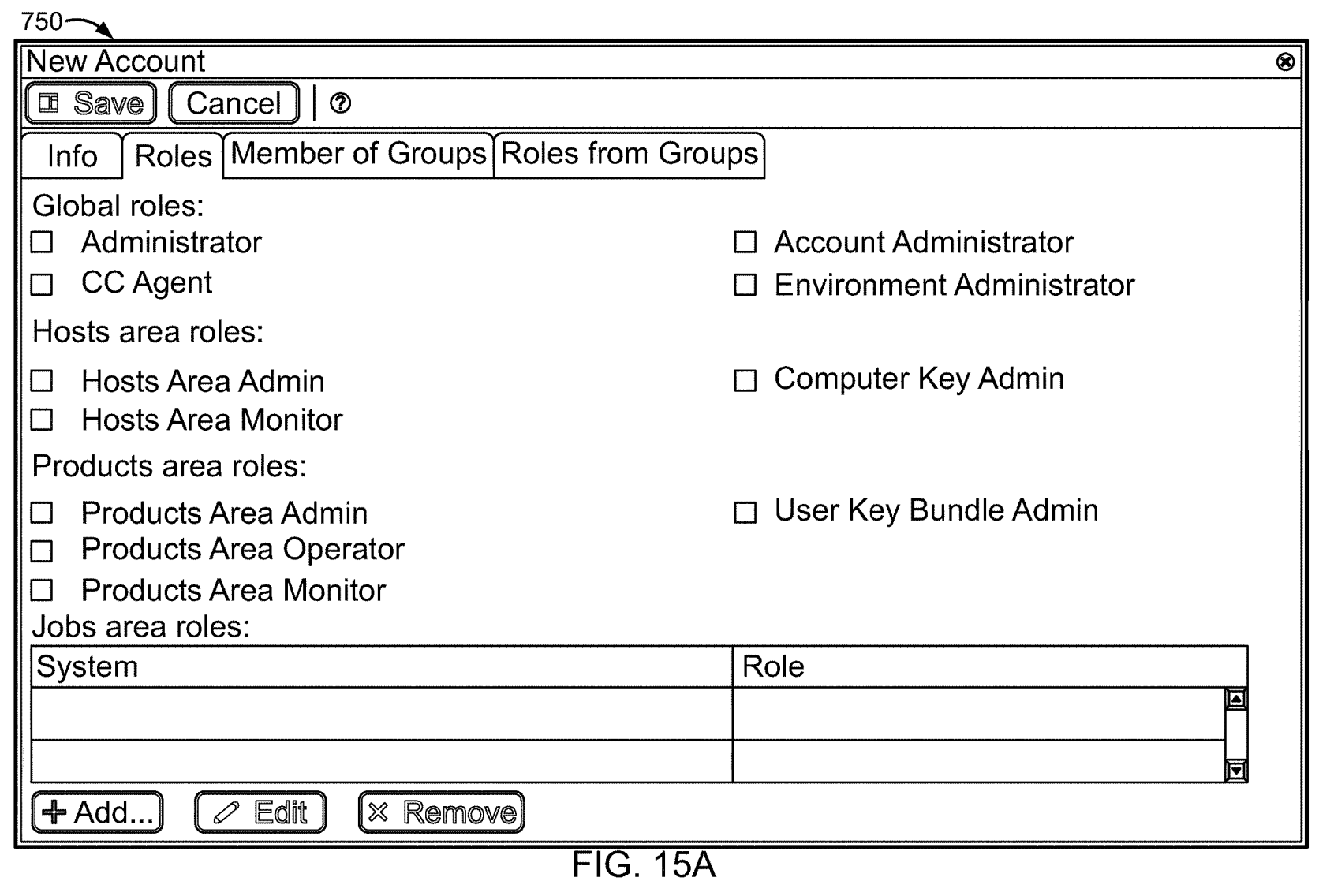
Figure 15B:
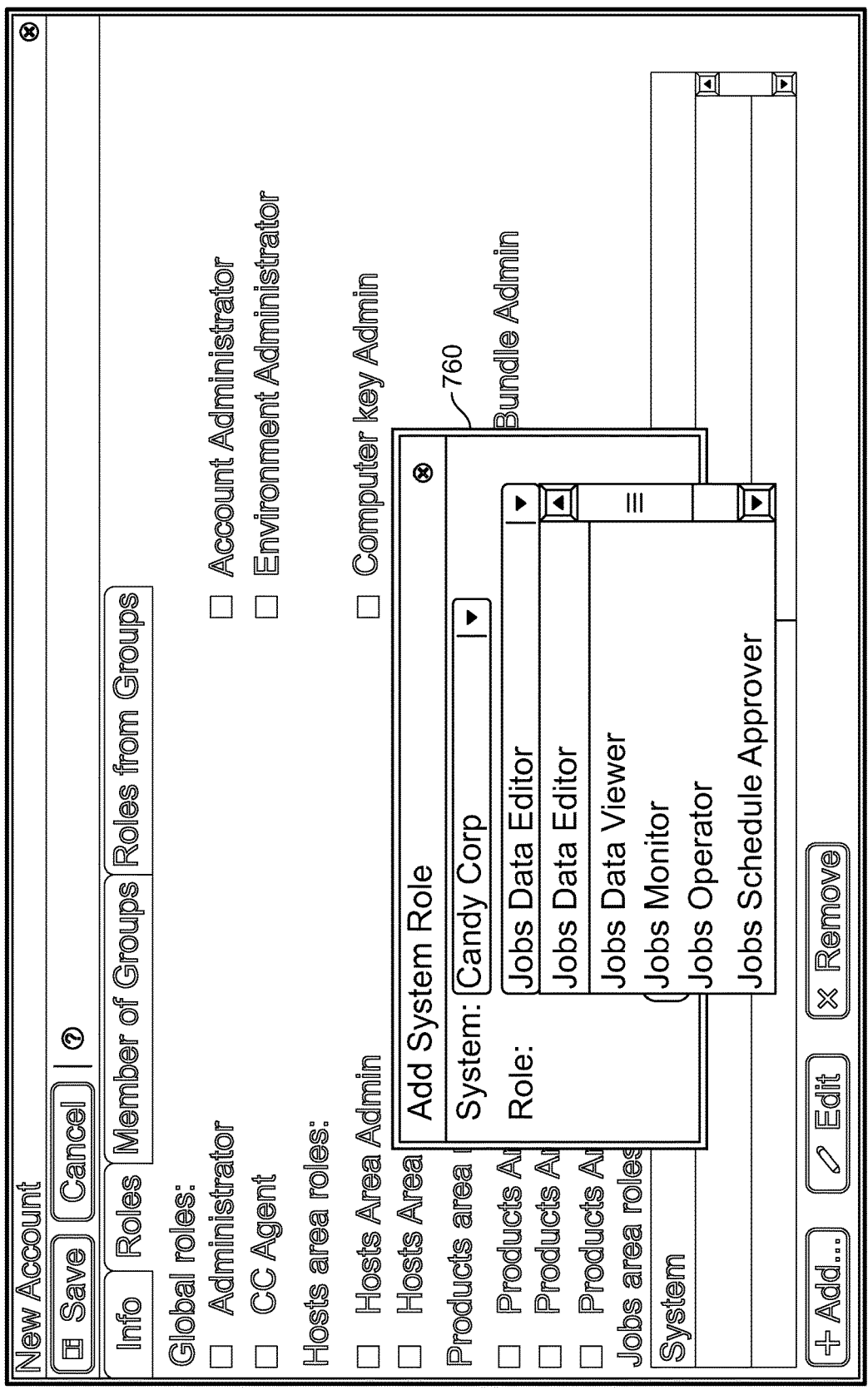

In some examples, the information displayed on the user interface, the actions available through the user interface, or both, can be limited based on the role of the user 102. For example, the processing system 100 includes a user account database (not shown in the figure) that has information on the security levels and/or roles of various users who can have access to the system 100. Referring to FIG. 15A, the control center 150 provides a view 750 for specifying the roles for a user when setting up a new account. For instance, a user 102 that has a host-oriented rule, such as a host monitor, a host administrator, or a computer key administrator, may be enabled to view status information and take actions related to hosts but be enabled only to view status information (or only selected status information) related to other components of the processing environment 100. Similarly, a user 102 with a product-oriented role, such as a product monitor, a product operator, a product administrator, or a user key bundle administrator, may be able to view status information and take actions related to products but only to view status information (or only selected status information) related to other components of the processing environment. A user 102 with a system-oriented role, such as a system monitor, a system operator, a system administrator, a scheduler, an approver, a data viewer, or a data editor, may be given access only to actions related to jobs 108 but access only to status information for other components of the processing environment 100. FIG. 15B shows an example view 760 for specifying the system-oriented role for a user. In some cases, a user 102 can have access to the entire functionality of the control center. For instance, a user 102 with administrative authority over the control center 150 itself, such as a security administrator, an administrator of the processing environment, or a general administrator, can have general access to all of the status information and all available actions provided by the control center 150.

FIG. 16 is a screenshot of an example view 630 for monitoring various custom objects or third party components. The view 630 provides a list of the custom objects or third party components 632, the corresponding types 634, and the hosts 636 on which the custom objects or third party components reside.

FIG. 17A is a screenshot of an example view 640 for allowing the user 102 to provide information about custom products or services. FIG. 17B is a screenshot of an example view 650 for allowing the user 102 to provide information about products or services related to the custom products or services. FIG. 17C is a screenshot of an example view 660 for allowing the user 102 to specify commands associated with the custom products or services. The user 102 can provide information indicative of a relationship between a custom product or service and other products or services that are already recognized by the control center 150. The user 102 can provide information indicative of how to interact with the custom product or service, such as how to start, stop, or restart the custom product or service, how to obtain the status of the custom product or service, or other actions. For instance, the user 102 can specify one or more mechanisms by which status of a custom product or service can be obtained or by which an action can be performed on the custom product or service. The mechanisms can include, e.g., commands, scripts, tokens, or other mechanisms that provide feedback to the control center 150 or the reporter 158, e.g., about the status of the custom product or service. In an example, a custom product has an associated script that, when executed, emits "running" when the product is running and "stopped" if the product is not running. In this example, the user can provide instructions for the control center to access and execute the script to obtain the status of the product.

FIG. 18 is a screenshot of an example table view 670 for showing information about queues 114. FIG. 19 is a screenshot of an example diagram view 680 for showing information about queues 114.

FIG. 20 is a screenshot of an example view 690 for showing information about resources.

The control center 150 can show related items for a product in an information bubble. FIGS. 21A to 21C, 22, and 23 illustrate views that allow the user 102 to discover relationships among various components (products, services, and jobs) of the processing environment 100. This way, when the user 102 is viewing the status information of a component (e.g., product, service, or job) the user 102 can conveniently access other related components (e.g., other product, service, or job).

Figure 21A:
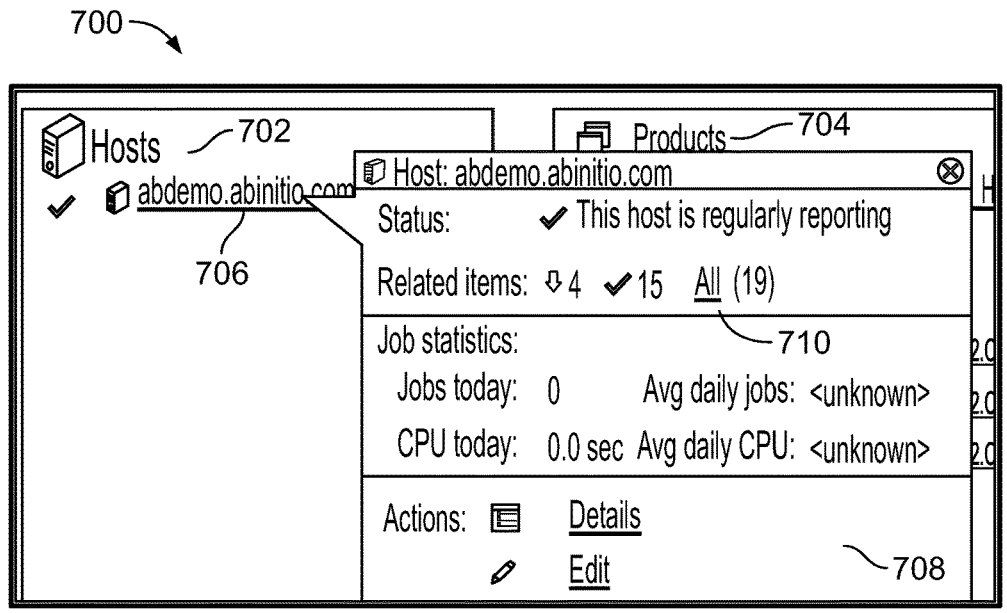
FIGS. 21A-21C are screenshots of example user interfaces.
Figure 21B:
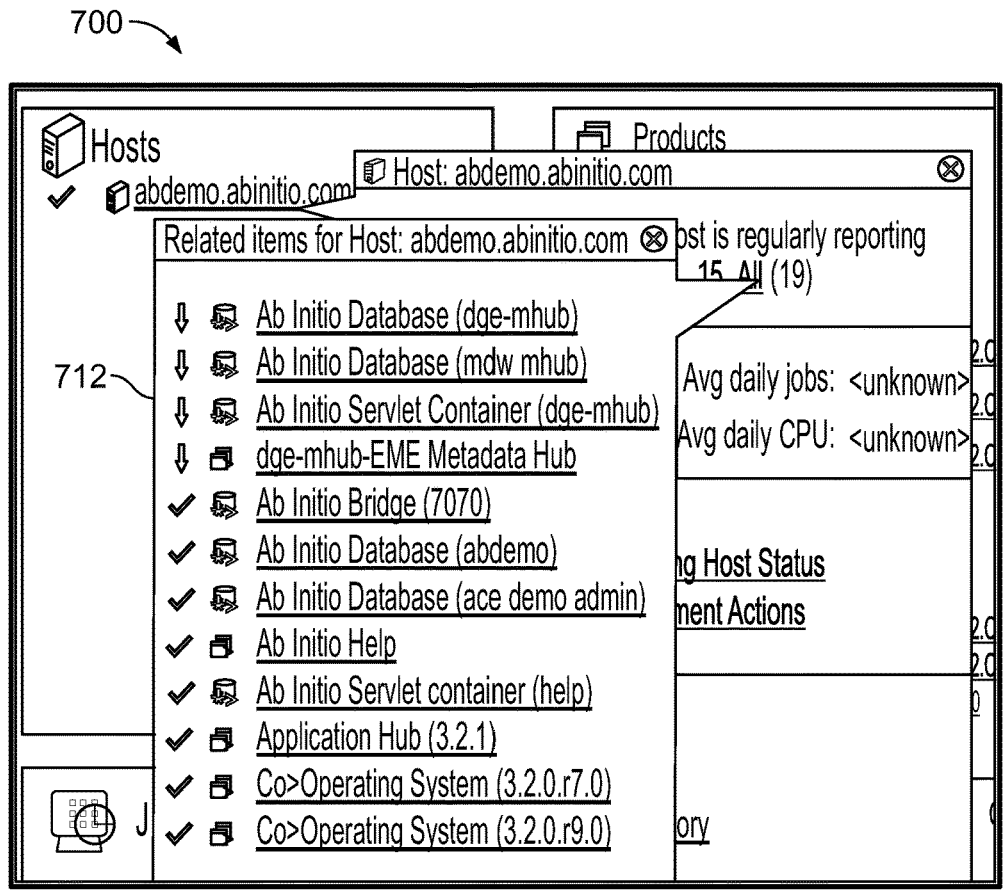
Figure 21C:
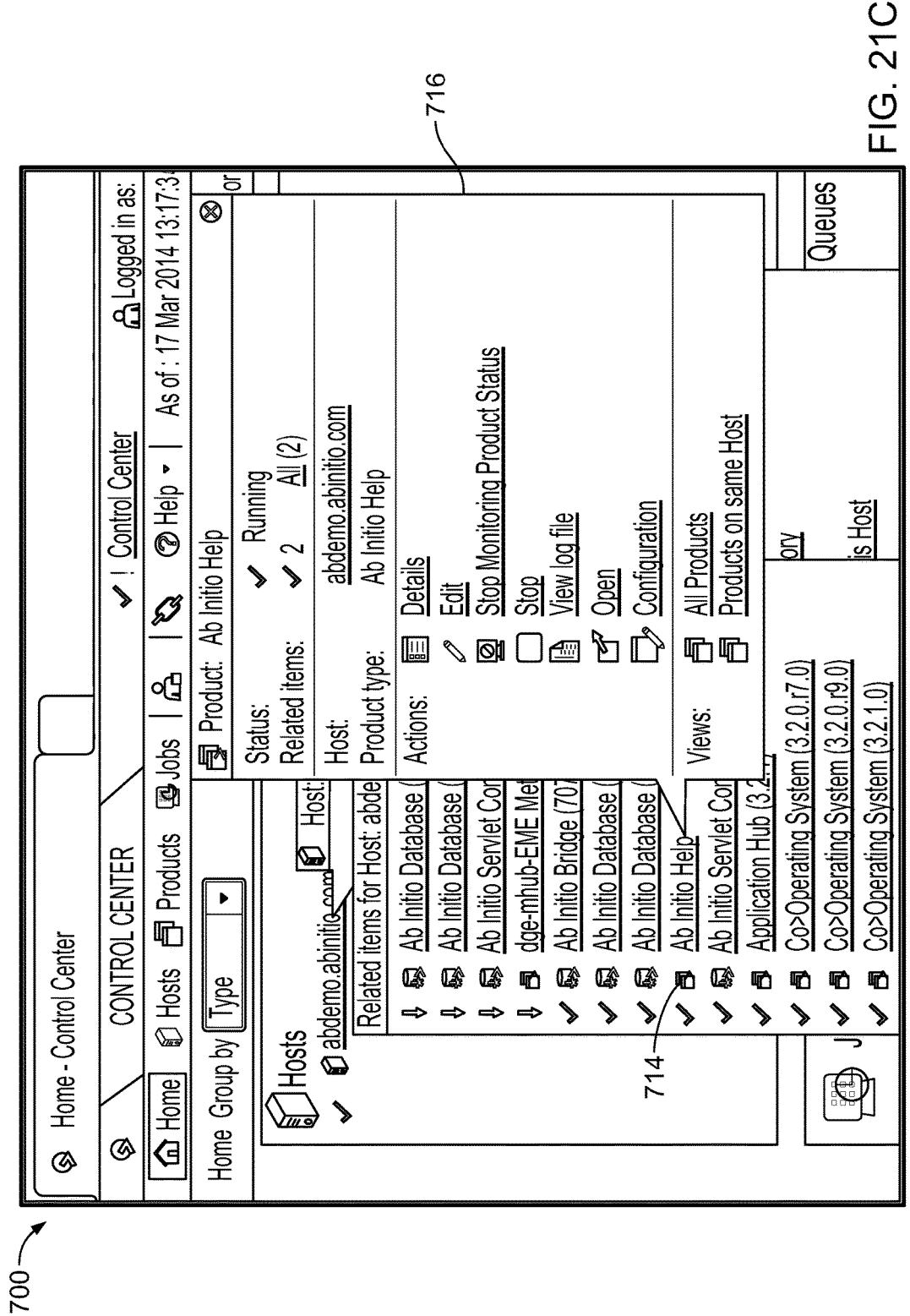

FIG. 21A is a screenshot of an example view 700 showing information about the status of hosts and products. The user 102 can click on the name of a host 706 to access an information bubble 708 showing information related to the host 706, such as the status, related items, job statistics, actions associated with the host 706. In this example, there are 19 related items associated with the host 706. The user 102 can click on a link 710 to access an information bubble 712 listing all of the related items, as shown in FIG. 21B. The user 102 can click on the name of a related item 714 to access an information bubble 716 showing information associated with the related item 714, as shown in FIG. 21C. For example, the information bubble 716 can provide information such as the status, related items, host, product type, actions, and views associated with the related item 714. In this example, the actions include "details," "edit," "stop monitoring product status," stop," "view log file," "open," and "configuration."

Figure 22:
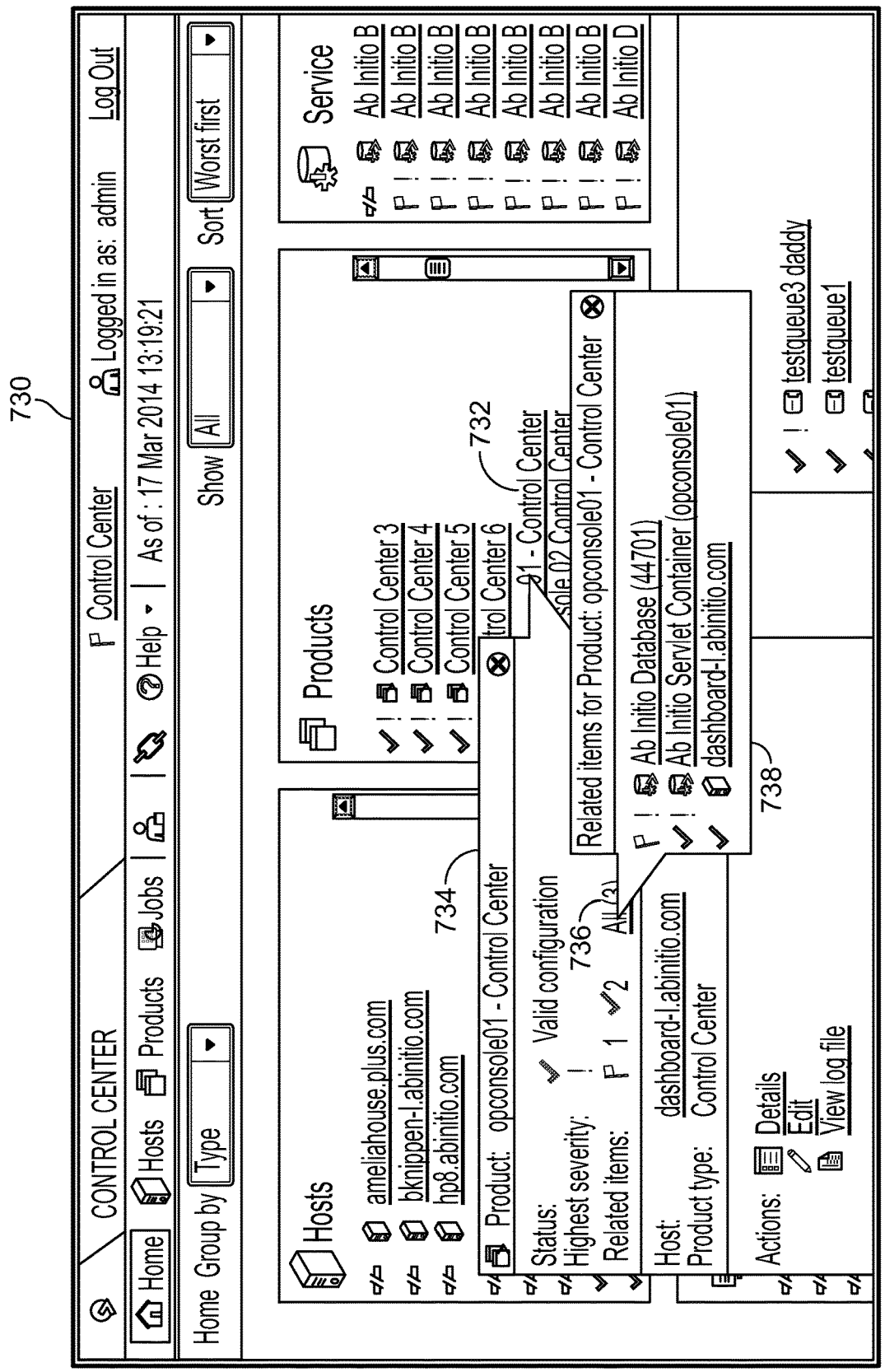

FIG. 22 is a screenshot of an example view 730 showing related items for a product. The user 102 can click on the name of a product 732 to access an information bubble 734 that shows information relevant to the product 732. In this example, the relevant information includes the status, highest severity, related items, host, product type, and actions. The user 102 can click on a link to access an information bubble 738 listing all the items related to the product 732.

Figure 23:
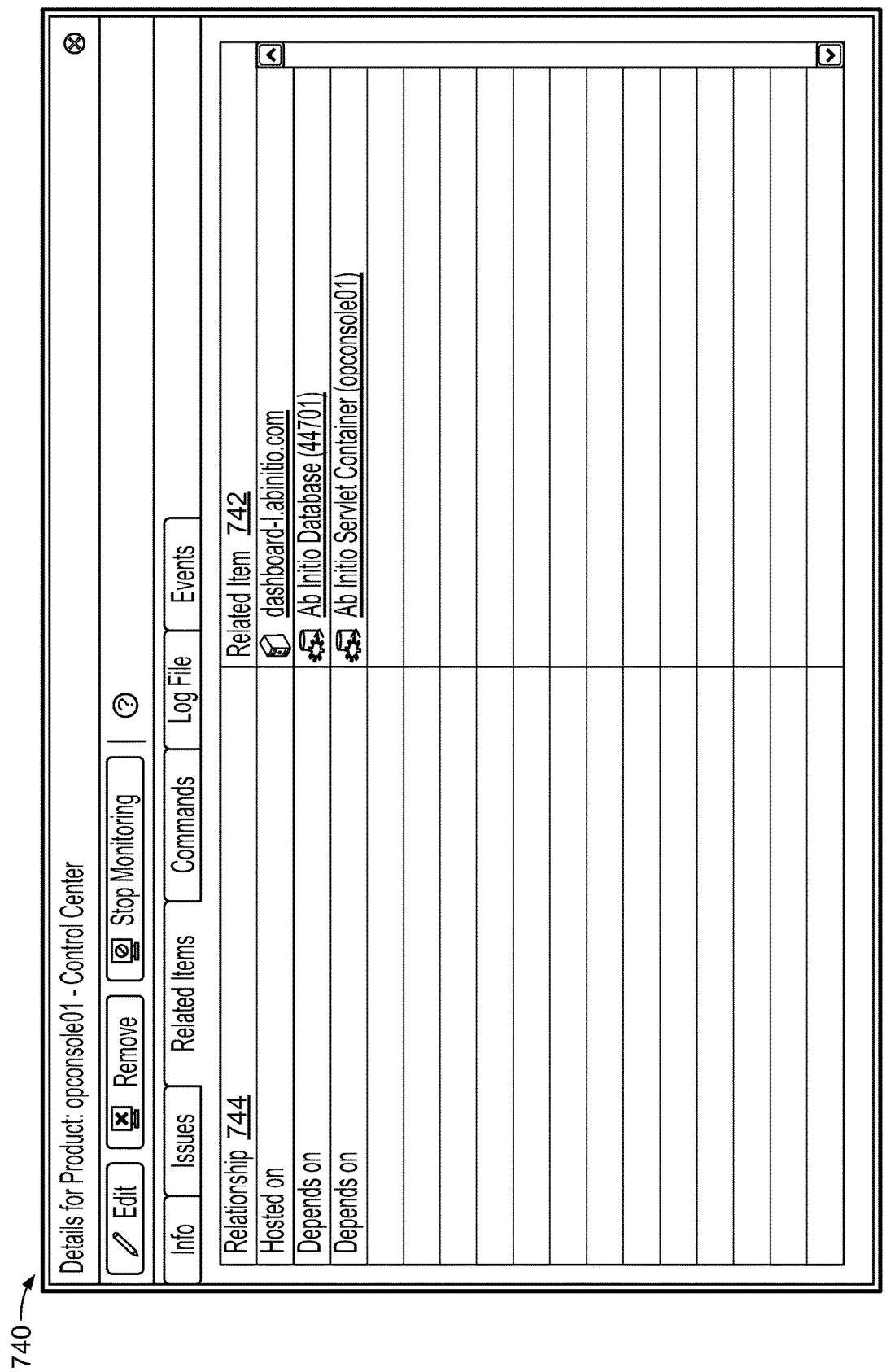

FIG. 23 is a screenshot of an example view 740 for providing detailed information on the related items. In this example, the interface 740 lists the names of the related items 742 and the relationships 744 with respect to the related items 742.

Figure 24:
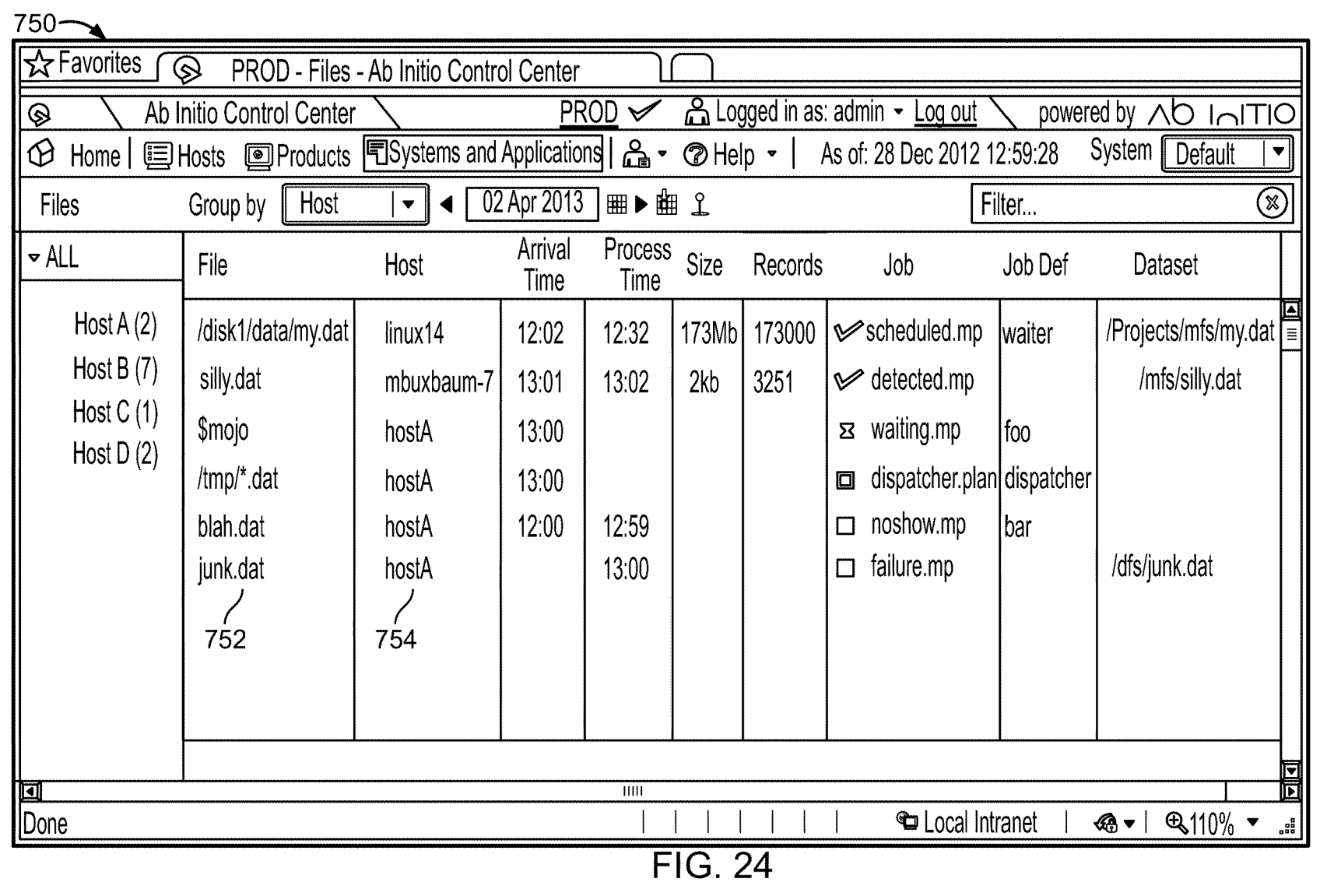

The control center 150 can monitor files and database tables that are read and written by the software components, including their expected arrival times and sizes. FIG. 24 is a screenshot of an example view 750 for providing information on various files 752, the hosts 754 on which the files 752 are stored, and other information such as arrival times, process times, sizes, records, related jobs, job definitions, and datasets.

Figure 25:
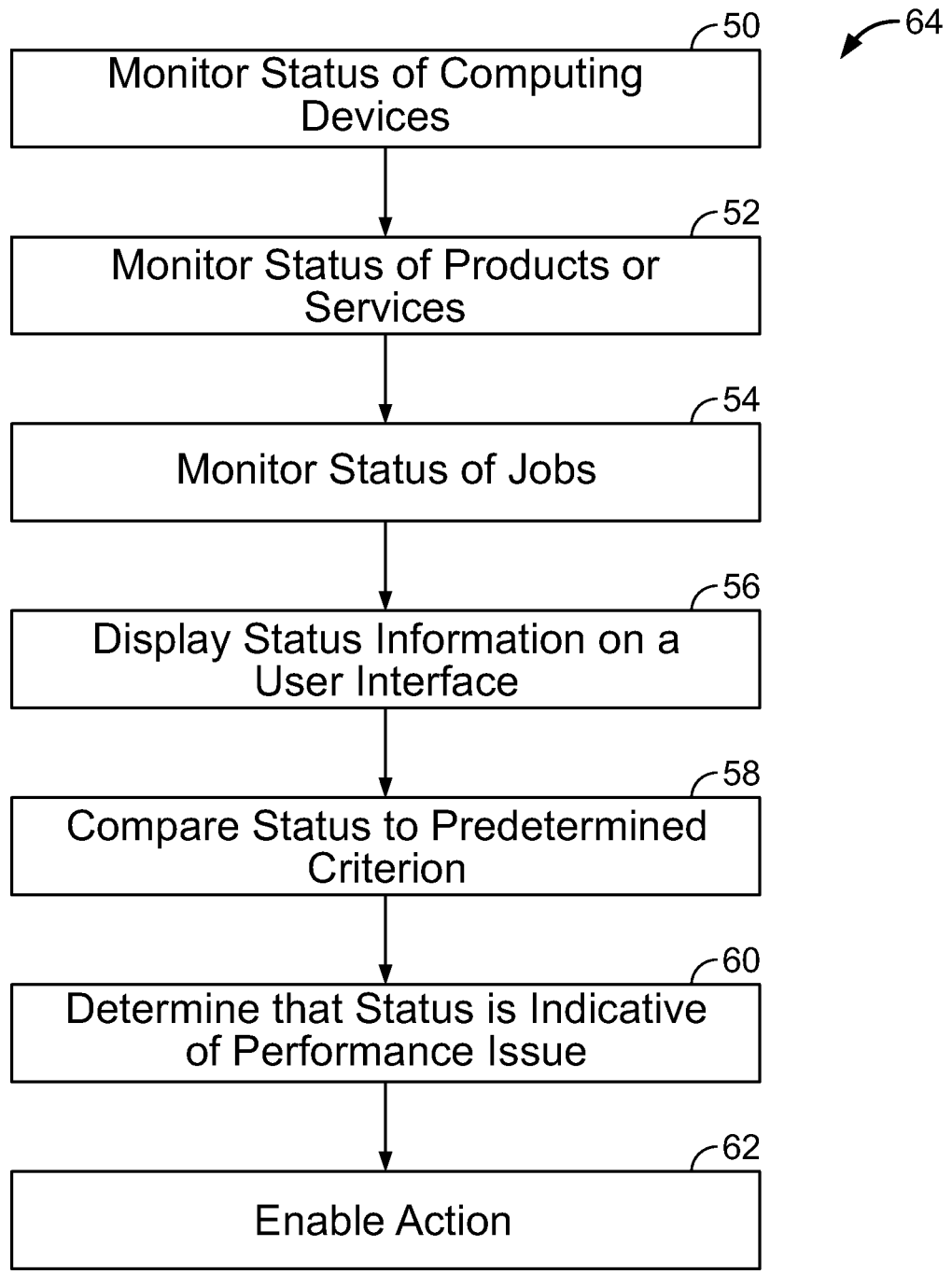
FIG. 25 is a flowchart.

Referring to FIG. 25, in a general process 64 for integrated monitoring and control of components of a processing environment, a control center monitors the status of one or more host computing devices (50), monitors the status of one or more products or services (52), and monitors the status of one or more jobs (54). Each of the monitored products and services is hosted by at least one of the monitored computing devices. Each of the monitored jobs is associated with at least one of the products or services and with at least one of the computing devices.

Display of status information for each of the components on a user interface is enabled (56). The status information is displayed in such a way as to make apparent relationships among components and the effect of the status of one component on the status of one or more other components of the processing environment.

The status of each of the components of the processing environment can include an operational status, one or more performance metrics, or both. The control center compares the status of one or more of the components with a predetermined criterion for that component (58) to determine whether the status is indicative of a performance issue with the component (60). If the status is indicative of a performance issue, the control center enables an action to be performed (62). In some cases, the action can be an automated action, such as the sending of an automated alert regarding the performance issue. In some cases, the action can be an action by a user of the user interface.

Figure 26:
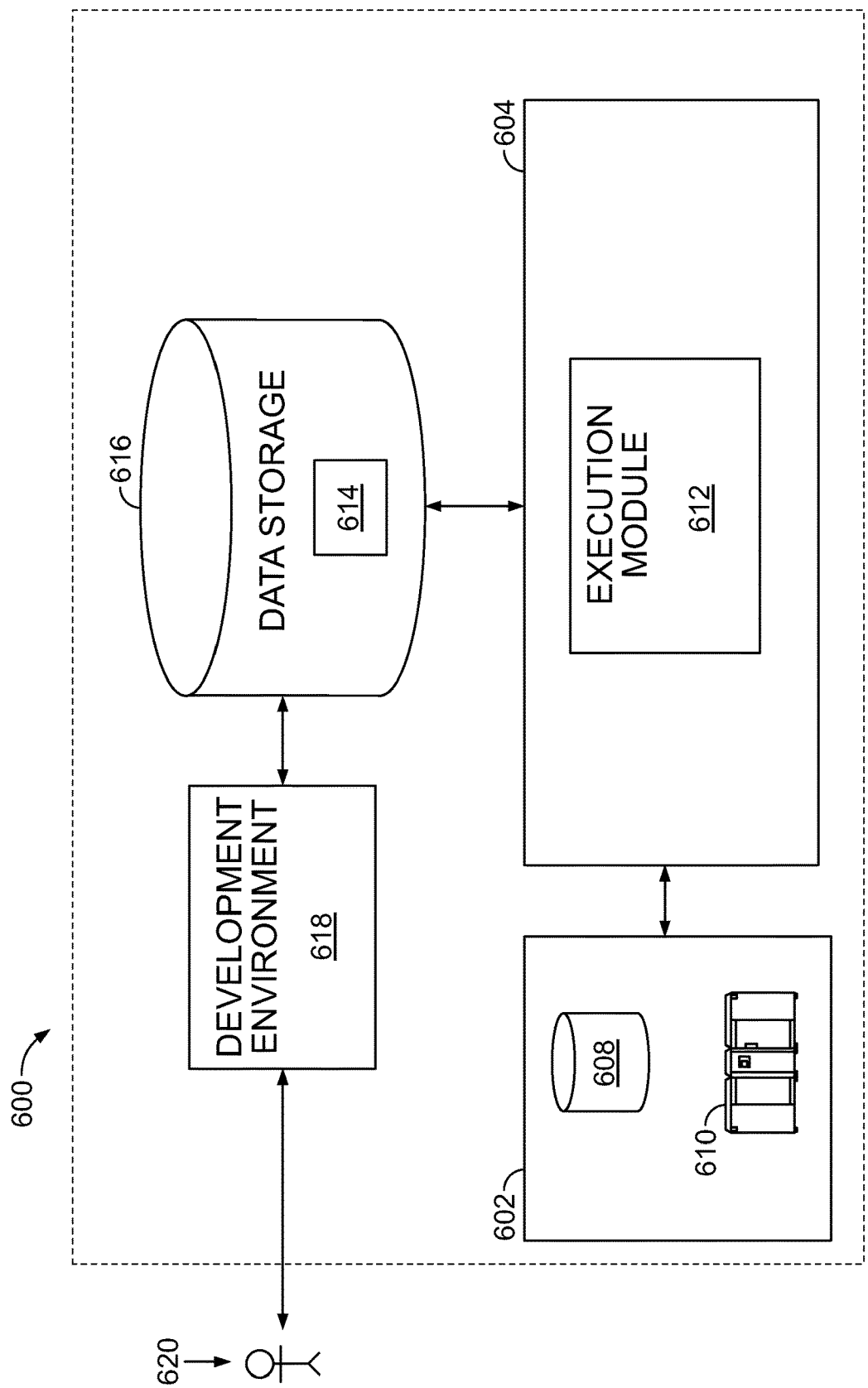
FIG. 26 is a block diagram of an example data processing system.

FIG. 26 shows an example of a data processing system 600 in which the techniques for integrated monitoring and control can be used. The data processing system 600 can be an implementation of the processing environment 100 described above. The system 600 includes a data source 602 that may include one or more sources of data such as storage devices or connections to online data streams, each of which may store or provide data in any of a variety of formats (e.g., database tables, spreadsheet files, flat text files, or a native format used by a mainframe). An execution environment 604 includes an execution module 612. The execution environment 604 may be hosted, for example, on one or more general-purpose computers under the control of a suitable operating system, such as a version of the UNIX operating system. For example, the execution environment 604 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems), or remote, or remotely distributed (e.g., multiple processors coupled via a local area network (LAN) and/or wide-area network (WAN)), or any combination thereof.

Storage devices providing the data source 602 may be local to the execution environment 604, for example, being stored on a storage medium connected to a computer hosting the execution environment 604 (e.g., hard drive 608), or may be remote to the execution environment 604, for example, being hosted on a remote system (e.g., mainframe 610) in communication with a computer hosting the execution environment 604, over a remote connection (e.g., provided by a cloud computing infrastructure).

The execution module 612 processes the data from the data source 602. The output data 614 may be stored back in the data source 602 or in a data storage system 616 accessible to the execution environment 604, or otherwise used. The data storage system 616 is also accessible to a development environment 618 in which a developer 620 is able to create or modify the processing activities to be carried out by the execution module. The development environment 618 is, in some implementations, a system for developing applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The approach to automated monitoring and control described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. For example, in addition to clicking on the name of a component to access an information bubble associated with the component, in some implementations the user can also hover a pointer (e.g., a mouse pointer) over the name of the component for a predetermined period of time (e.g., 1 second) to cause the information bubble to appear. The information provided by the processing environment 100 and shown on the user interface 156 can be different from the examples in FIGS. 4-24. In the dashboard view 400, the user may selectively turn on or off views of status information of various components of the system so that more or less information about components are simultaneously shown in the dashboard. The dashboard can be shown across several windows or display screens. The dashboard and other screens can be formatted in various ways depending on the display device. For example, the dashboard can have a first format suitable for display on a cell phone, a second format suitable for display on a tablet computer, a third format suitable for display on a desktop monitor, and a fourth mode suitable for display spanning multiple monitors.

In this description, enabling display of first information about status of computing devices, second information about status of applications, and third information about status of jobs does not mean that the first, second, and third information all have to be displayed at the same time. Rather, one, two, or all three types of information can be displayed at a given time depending on, e.g., user preferences and constraints of display devices. When one type of information is shown on the user interface, links may be provided to enable the user to show the other two types of information. When two types of information are shown on the user interface, a link may be provided to enable the user to show the third type of information. FIG. 1 shows one user and one user interface, but multiple users can access the processing system through multiple user interfaces at the same time, in which different users may have the same or different roles, Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method including:
monitoring a status of each of one or more computing devices;
monitoring a status of each of one or more applications, wherein each application is a software program hosted by at least one of the computing devices;
monitoring a status of each of one or more data processing jobs,
wherein each data processing job is executed on one or more of the computing devices using at least one of the applications,
wherein a data processing job, when executed, receives data records from a data source hosted by at least one of the computing devices, performs one or more operations to process the received data records, and outputs the processed data records to a destination hosted by at least one of the computing devices,
determining that one of the status of one of the computing devices, the status of one of the applications, and the status of one of the data processing jobs is indicative of a performance issue associated with the corresponding computing device, application, or data processing job, the determination being made based on a comparison of a performance of the computing device, application, or data processing job and at least one predetermined criterion; and
enabling an action to be performed associated with the performance issue.

2. The method of claim 1, wherein the monitoring includes monitoring the status of each of the one or more computing devices, the status of each of the one or more applications, and the status of each of the one or more data processing jobs using an integrated control system.

3. The method of claim 1, wherein enabling an action to be performed includes automatically performing the action.

4. The method of claim 1, wherein enabling an action to be performed includes performing the action responsive to input from a user.

5. The method of claim 1, wherein enabling an action to be performed includes one or more of providing an alert indicative of the performance issue and sending a communication indicative of the performance issue.

6. The method of claim 1, wherein monitoring the status of a computing device includes monitoring one or more of a CPU usage of the computing device and a memory usage of the computing device.

7. The method of claim 1, wherein monitoring the status of an application includes monitoring a configuration status of the application.

8. The method of claim 7, wherein enabling an action to be performed includes enabling a user to configure the application.

9. The method of claim 1, wherein monitoring the status of an application includes monitoring a license status of the application.

10. The method of claim 9, wherein enabling an action to be performed includes prompting a user for a license key associated with the application.

11. The method of claim 10, wherein enabling an action to be performed includes receiving the license key from the user and updating the license status of the application based on the received license key.

12. The method of claim 1, wherein monitoring the status of a data processing job includes monitoring the status of one or more services associated with the data processing job.

13. The method of claim 12, wherein the services include one or more of a database, a queue, and a file.

14. The method of claim 1, including providing, to a user, information indicative of one or more of the status of at least one of the computing devices, the status of at least one of the applications, and the status of at least one of the data processing jobs.

15. The method of claim 14, wherein providing the information includes displaying the information on a user interface.

16. The method of claim 1, including automatically identifying one or more of at least one of the computing devices to be monitored, at least one of the applications to be monitored, and at least one of the data processing jobs to be monitored.

17. The method of claim 1, including receiving, from a user, an identifier of one or more of at least one of the computing devices to be monitored, at least one of the applications to be monitored, and at least one of the data processing jobs to be monitored.

18. The method of claim 1, wherein determining that one of the statuses is indicative of a performance issue includes comparing a metric with a threshold value.

19. The method of claim 1, including predicting that one of the computing devices, applications, or data processing jobs is likely to have a performance issue at a future time, the prediction being made based on real time status information and historical status information of the computing device, application, or data processing job and at least one predetermined criterion.

20. The method of claim 19 in which the predicting includes predicting whether one of the computing devices is likely to have a capacity issue based on a number of data processing jobs predicted to be running on the computer device at a particular time and an average CPU usage of each of the data processing jobs.

21. The method of claim 1, including identifying a role of a user, and selectively providing information on one of the status of one of the computing devices, the status of one of the applications, and the status of one of the data processing jobs based on the role of the user.

22. The method of claim 1, including monitoring a status of each of one or more queues used by one or more of the data processing jobs.

23. The method of claim 1, including monitoring a status of each of one or more resources used by one or more of the data processing jobs.

24. The method of claim 1, including monitoring a status of each of one or more files written by one or more of the data processing jobs.

25. The method of claim 1, wherein monitoring a status of each of one or more data processing jobs includes monitoring an execution status of at least one of the data processing jobs.

26. The method of claim 25, wherein monitoring the execution status of a data processing job includes monitoring one or more of an activity of the data processing job, an actual start time of the data processing job, an estimated start time of the data processing job, a processing duration associated with the data processing job, and a size of the data processing job.

27. The method of claim 1, wherein monitoring a status of each of one or more applications includes monitoring one or more of an authorization status of at least one of the applications and a configuration status of at least one of the applications, and wherein monitoring a status of each of one or more data processing jobs includes monitoring an execution status of at least one of the data processing jobs.

28. The method of claim 1, including displaying, on a user interface, to information indicative of relationships among the one or more computing devices, the one or more applications, and the one or more jobs.

29. The method of claim 1, including monitoring an operational status of one or more of the data source from which the data records are received and the destination to which the processed data records are output.

30. A method including:
monitoring a status of each of one or more computing devices;
monitoring a status of each of one or more applications, wherein each application is a software program hosted by at least one of the computing devices;
monitoring a status of each of one or more data processing jobs,
wherein each data processing job is executed on one or more of the computing devices using at least one of the applications,
wherein a data processing job, when executed, receives data records from a data source hosted by at least one of the computing devices, performs one or more operations to process the received data records, and outputs the processed data records to a destination hosted by at least one of the computing devices; and
enabling display, on a user interface, of first information indicative of the status of one or more of the computing devices, second information indicative of the status of one or more of the applications, and third information indicative of the status of one or more of the data processing jobs, including for each computing device having corresponding first information displayed on the user interface, enabling a user to access the second information for one or more applications hosted by the computing device and the third information for one or more data processing jobs executed on the computing device;

for each application having corresponding second information displayed on the user interface, enabling the user to access the first information for one or more computing devices hosting the application and the third information for one or more data processing jobs executed using the application, and for each data processing job having corresponding third information displayed on the user interface, enabling the user to access the first information for one or more computing devices on which the data processing job is executed and the second information for one or more applications used during execution of the data processing job.

31. The method of claim 30, including displaying, on the user interface, an alert indicative of a performance issue associated with one or more of at least one of the computing devices, at least one of the applications, and at least one of the data processing jobs.

32. The method of claim 31, including receiving input through the user interface; and performing an action associated with the performance issue based on the received input.

33. The method of claim 30, comprising for each computing device having corresponding first information displayed on the user interface, providing a first link to enable the user to access the second information and a second link to enable the user to access the third information.

34. A non-transitory computer readable storage medium storing instructions for causing a computing system to:
monitor a status of each of one or more computing devices;
monitor a status of each of one or more applications, wherein each application is a software program hosted by at least one of the computing devices;
monitor a status of each of one or more data processing jobs,
wherein each data processing job is executed on one or more of the computing devices using at least one of the applications,
wherein a data processing job, when executed, receives data records from a data source hosted by at least one of the computing devices, performs one or more operations to process the received data records, and outputs the processed data records to a destination hosted by at least one of the computing devices;
determine that one of the status of one of the computing devices, the status of one of the applications, and the status of one of the data processing jobs is indicative of a performance issue associated with the corresponding computing device, application, or data processing job, the determination being made based on a comparison of a performance of the computing device, application, or data processing job and at least one predetermined criterion; and
enable an action to be performed associated with the performance issue.

35. The computer readable storage medium of claim 34, wherein enabling an action to be performed includes one or more of providing an alert indicative of the performance issue and sending a communication indicative of the performance issue.

36. The computer readable storage medium of claim 34, wherein monitoring the status of a computing device includes monitoring one or more of a CPU usage of the computing device and a memory usage of the computing device.

37. The computer readable storage medium of claim 34, wherein monitoring the status of an application includes monitoring a configuration status of the application.

38. The computer readable storage medium of claim 37, wherein enabling an action to be performed includes enabling a user to configure the application.

39. The computer readable storage medium of claim 34, wherein monitoring the status of an application includes monitoring a license status of the application.

40. The computer readable storage medium of claim 39, wherein enabling an action to be performed includes prompting a user for a license key associated with the application.

41. The computer readable storage medium of claim 40, wherein enabling an action to be performed includes receiving the license key from the user and updating the license status of the application based on the received license key.

42. The computer readable storage medium of claim 34, wherein monitoring the status of a data processing job includes monitoring the status of one or more services associated with the job.

43. The computer readable storage medium of claim 34, storing instructions for causing the computing system to predict that one of the computing devices, applications, or data processing jobs is likely to have a performance issue at a future time, the prediction being made based on real time status information and historical status information of the computing device, application, or data processing job and at least one predetermined criterion.

44. The computer readable storage medium of claim 43 in which the predicting includes predicting whether one of the computing devices is likely to have a capacity issue based on a number of data processing jobs predicted to be running on the computer device at a particular time and an average CPU usage of each of the data processing jobs.

45. The computer readable storage medium of claim 34, storing instructions for causing the computing system to identify a role of a user, and selectively providing information on one of the status of one of the computing devices, the status of one of the applications, and the status of one of the data processing jobs based on the role of the user.

46. The computer readable storage medium of claim 34, wherein monitoring a status of each of one or more data processing jobs includes monitoring an execution status of at least one of the data processing jobs.

47. The computer readable storage medium of claim 46, wherein monitoring the execution status of a data processing job includes monitoring one or more of an activity of the data processing job, an actual start time of the data processing job, an estimated start time of the data processing job, a processing duration associated with the data processing job, and a size of the data processing job.

48. The computer readable storage medium of claim 34, wherein monitoring a status of each of one or more applications includes monitoring one or more of an authorization status of at least one of the applications and a configuration status of at least one of the applications, and wherein monitoring a status of each of one or more data processing jobs includes monitoring an execution status of at least one of the data processing jobs.

49. The computer readable storage medium of claim 34, the instructions causing the computing system to display, on a user interface, to information indicative of relationships among the one or more computing devices, the one or more applications, and the one or more jobs.

50. A system comprising:
one or more processors coupled to a memory, the one or more processors and memory configured to:
monitor a status of each of one or more computing devices;
monitor a status of each of one or more applications, wherein each application is a software program hosted by at least one of the computing devices;
monitor a status of each of one or more data processing jobs,
wherein each data processing job is executed on one or more of the computing devices using at least one of the applications,
wherein a data processing job, when executed, receives data records from a data source hosted by at least one of the computing devices, performs one or more operations to process the received data records, and outputs the processed data records to a destination hosted by at least one of the computing devices;
determine that one of the status of one of the computing devices, the status of one of the applications, and the status of one of the data processing jobs is indicative of a performance issue associated with the corresponding computing device, application, or data processing job, the determination being made based on a comparison of a performance of the computing device, application, or data processing job and at least one predetermined criterion; and
enable an action to be performed associated with the performance issue.

51. The system of claim 50, wherein enabling an action to be performed includes one or more of providing an alert indicative of the performance issue and sending a communication indicative of the performance issue.

52. The system of claim 50, wherein monitoring the status of a computing device includes monitoring one or more of a CPU usage of the computing device and a memory usage of the computing device.

53. The system of claim 50, wherein monitoring the status of an application includes monitoring a configuration status of the application.

54. The system of claim 53, wherein enabling an action to be performed includes enabling a user to configure the application.

55. The system of claim 50, wherein monitoring the status of an application includes monitoring a license status of the application.

56. The system of claim 55, wherein enabling an action to be performed includes prompting a user for a license key associated with the application.

57. The system of claim 56, wherein enabling an action to be performed includes receiving the license key from the user and updating the license status of the application based on the received license key.

58. The system of claim 50, wherein monitoring the status of a data processing job includes monitoring the status of one or more services associated with the data processing job.

59. The system of claim 50, the one or more processors and memory configured to predict that one of the computing devices, applications, or data processing jobs is likely to have a performance issue at a future time, the prediction being made based on real time status information and historical status information of the computing device, application, or data processing job and at least one predetermined criterion.

60. The system of claim 59 in which the predicting includes predicting whether one of the computing devices is likely to have a capacity issue based on a number of data processing jobs predicted to be running on the computer device at a particular time and an average CPU usage of each of the data processing jobs.

61. The system of claim 50, the one or more processors and memory configured to identify a role of a user, and selectively providing information on one of the status of one of the computing devices, the status of one of the applications, and the status of one of the data processing jobs based on the role of the user.

62. The system of claim 50, wherein monitoring a status of each of one or more data processing jobs includes monitoring an execution status of at least one of the data processing jobs.

63. The system of claim 62, wherein monitoring the execution status of a data processing job includes monitoring one or more of an activity of the data processing job, an actual start time of the data processing job, an estimated start time of the data processing job, a processing duration associated with the data processing job, and a size of the data processing job.

64. The system of claim 50, wherein monitoring a status of each of one or more applications includes monitoring one or more of an authorization status of at least one of the applications and a configuration status of at least one of the applications, and wherein monitoring a status of each of one or more data processing jobs includes monitoring an execution status of at least one of the data processing jobs.

65. The system of claim 50, the one or more processors and memory configured to display, on a user interface, to information indicative of relationships among the one or more computing devices, the one or more applications, and the one or more jobs.

66. A system comprising:
means for monitoring a status of each of one or more computing devices;
means for monitoring a status of each of one or more applications, wherein each application is a software program hosted by at least one of the computing devices;
means for monitoring a status of each of one or more data processing jobs,
wherein each data processing job is executed on one or more of the computing devices using at least one of the applications,
wherein a data processing job, when executed, receives data records from a data source hosted by at least one of the computing devices, performs one or more operations to process the received data records, and outputs the processed data records to a destination hosted by at least one of the computing devices;
means for determining that one of the status of one of the computing devices, the status of one of the applications, and the status of one of the data processing jobs is indicative of a performance issue associated with the corresponding computing device, application, or data processing job, the determination being made based on a comparison of a performance of the computing device, application, or data processing job and at least one predetermined criterion; and
means for enabling an action to be performed associated with the performance issue.

67. A non-transitory computer readable storage medium storing instructions for causing a computing system to:
monitor a status of each of one or more computing devices;
monitor a status of each of one or more applications, wherein each application is a software program hosted by at least one of the computing devices;
monitor a status of each of one or more data processing jobs,
wherein each data processing job is executed on one or more of the computing devices using at least one of the applications,
wherein a data processing job, when executed, receives data records from a data source hosted by at least one of the computing devices, performs one or more operations to process the received data records, and outputs the processed data records to a destination hosted by at least one of the computing devices; and
enable display, on a user interface, of first information indicative of the status of one or more of the computing devices, second information indicative of the status of one or more of the applications, and third information indicative of the status of one or more of the data processing jobs, including
for each computing device having corresponding first information displayed on the user interface, enabling a user to access the second information for one or more applications hosted by the computing device and the third information for one or more data processing jobs executed on the computing device;
for each application having corresponding second information displayed on the user interface, enabling the user to access the first information for one or more computing devices hosting the application and the third information for one or more data processing jobs executed using the application, and
for each data processing job having corresponding third information displayed on the user interface, enabling the user to access the first information for one or more computing devices on which the data processing job is executed and the second information for one or more applications used during execution of the data processing job.

68. A system comprising:
one or more processors coupled to a memory, the one or more processors and memory configured to:
monitor a status of each of one or more computing devices;
monitor a status of each of one or more applications, wherein each application is a software program hosted by at least one of the computing devices;
monitor a status of each of one or more data processing jobs,
wherein each data processing job is executed on one or more of the computing devices using at least one of the applications,
wherein a data processing job, when executed, receives data records from a data source hosted by at least one of the computing devices, performs one or more operations to process the received data records, and outputs the processed data records to a destination hosted by at least one of the computing devices; and
enable display, on a user interface, of first information indicative of the status of one or more of the computing devices, second information indicative of the status of one or more of the applications, and third information indicative of the status of one or more of the data processing jobs, including
for each computing device having corresponding first information displayed on the user interface, enabling a user to access the second information for one or more applications hosted by the computing device and the third information for one or more data processing jobs executed on the computing device;
for each application having corresponding second information displayed on the user interface, enabling the user to access the first information for one or more computing devices hosting the application and the third information for one or more data processing jobs executed using the application, and
for each data processing job having corresponding third information displayed on the user interface, enabling the user to access the first information for one or more computing devices on which the data processing job is executed and the second information for one or more applications used during execution of the data processing job.

69. A system comprising:
means for monitoring:
a status of each of one or more computing devices,
a status of each of one or more applications, wherein each application is a software program hosted by at least one of the computing devices, and
a status of each of one or more data processing jobs,
wherein each data processing job is executed on one or more of the computing devices using at least one of the applications,
wherein a data processing job, when executed, receives data records from a data source hosted by at least one of the computing devices, performs one or more operations to process the received data records, and outputs the processed data records to a destination hosted by at least one of the computing devices; and
means for enabling display, on a user interface, of first information indicative of the status of one or more of the computing devices, second information indicative of the status of one or more of the applications, and third information indicative of the status of one or more of the data processing jobs, including
for each computing device having corresponding first information displayed on the user interface, enabling a user to access the second information for one or more applications hosted by the computing device and the third information for one or more data processing jobs executed on the computing device;
for each application having corresponding second information displayed on the user interface, enabling the user to access the first information for one or more computing devices hosting the application and the third information for one or more data processing jobs executed using the application, and
for each data processing job having corresponding third information displayed on the user interface, enabling the user to access the first information for one or more computing devices on which the data processing job is executed and the second information for one or more applications used during execution of the data processing job.

* * * * *